(12) United States Patent
Raque et al.

(10) Patent No.: US 7,264,109 B2
(45) Date of Patent: Sep. 4, 2007

(54) TRANSPORT SYSTEM

(75) Inventors: Glen Raque, Louisville, KY (US);
Jerry Barnes, Crestwood, KY (US);
Wail Elkhatib, Louisville, KY (US);
Robert Raque, Louisville, KY (US);
Michael Weidman, Crestwood, KY (US)

(73) Assignee: Raque Food Systems, Inc., Louisville, KY (US)

( * ) Notice: Subject to any disclaimer, the term of this patent is extended or adjusted under 35 U.S.C. 154(b) by 5 days.

(21) Appl. No.: 11/227,742

(22) Filed: Sep. 15, 2005

(65) Prior Publication Data

US 2006/0060449 A1    Mar. 23, 2006

Related U.S. Application Data

(63) Continuation of application No. 10/678,708, filed on Oct. 3, 2003, now abandoned.

(51) Int. Cl.
*B65G 37/00* (2006.01)
*B65G 43/00* (2006.01)

(52) U.S. Cl. .................. 198/460.1; 198/572; 198/575; 198/577

(58) Field of Classification Search ............ 198/460.1, 198/572, 575, 577
See application file for complete search history.

(56) References Cited

U.S. PATENT DOCUMENTS

| | | | |
|---|---|---|---|
| 2,286,571 A | 6/1942 | Pollard | |
| 3,419,238 A | 12/1968 | Flory | |
| 3,817,368 A | 6/1974 | Wentz et al. | |
| 4,197,794 A | 4/1980 | Raque et al. | |
| 4,407,625 A | 10/1983 | Shum | |
| 4,435,116 A | 3/1984 | Van Deberg | |
| 4,569,627 A | 2/1986 | Simunovic | |
| 4,651,589 A | 3/1987 | Lambert | |
| 4,676,050 A | 6/1987 | Odenthal | |
| 4,712,971 A | 12/1987 | Fyler | |
| 4,732,525 A | 3/1988 | Neumann | |
| 4,976,582 A | 12/1990 | Clavel | |
| 5,038,915 A | 8/1991 | Delsanto | |
| 5,053,687 A | 10/1991 | Merlet | |
| 5,088,912 A | 2/1992 | Raque et al. | |
| 5,141,097 A | 8/1992 | Oiry et al. | |
| 5,279,176 A | 1/1994 | Tahmasebi et al. | |
| 5,301,566 A | 4/1994 | Tahmasebi et al. | |

(Continued)

FOREIGN PATENT DOCUMENTS

EP    0 250 470    1/1988

(Continued)

OTHER PUBLICATIONS

*Serial and parallel geometry Robots*, http://www.sigdemaurex.com/English/Products_E/Geometr_E/Geom_E.htm . one page.

(Continued)

*Primary Examiner*—Douglas Hess
(74) *Attorney, Agent, or Firm*—Bose McKinney & Evans LLP

(57) ABSTRACT

The present disclosure relates to a method and apparatus for controlling the transportation of a product from a first transporter to a second transporter. Further, a feed transport system and method of use is provided.

17 Claims, 15 Drawing Sheets

U.S. PATENT DOCUMENTS

| | | | |
|---|---|---|---|
| 5,333,514 | A | 8/1994 | Toyama et al. |
| 5,341,916 | A * | 8/1994 | Doane et al. ............ 198/460.1 |
| 5,588,285 | A | 12/1996 | Odenthal |
| 5,656,905 | A | 8/1997 | Tsai |
| 5,715,729 | A | 2/1998 | Toyama et al. |
| 5,768,856 | A | 6/1998 | Odenthal |
| 6,302,266 | B1 * | 10/2001 | DeFrancisco et al. .. 198/781.06 |
| 6,370,447 | B1 * | 4/2002 | Miyazaki .................... 700/230 |
| 6,438,925 | B1 | 8/2002 | Straub |
| 6,540,063 | B1 * | 4/2003 | Fallas et al. ............. 198/461.1 |
| 6,543,987 | B2 | 4/2003 | Ehrat |
| 6,554,336 | B2 | 4/2003 | Huppi |
| 6,564,927 | B2 | 5/2003 | Meyer |
| 6,578,614 | B1 | 6/2003 | Loewenthal |
| 6,629,593 | B2 | 10/2003 | Zeitler |
| 7,016,768 | B2 * | 3/2006 | Grafer et al. ............... 700/230 |

FOREIGN PATENT DOCUMENTS

| | | |
|---|---|---|
| FR | 2 647 763 | 12/1990 |
| FR | 2 672 836 | 8/1992 |
| RU | 0422580 | 4/1974 |
| WO | WO99/67066 | 12/1999 |

OTHER PUBLICATIONS

*Delta Robot*, http://www.sigdemaurex.com/English/Products_E/Geometr_E/technical_information.htm , one page.

*FAQ*, http://www.sigpack.com/english/faq/index.htm , one page.

Fenner, Bernard C., *Media Releases*, http://www.sigpack.com/english/sig_pack/mediareleases/medi20.htm . one page. (Feb. 2003).

*Packaging with Delta Robots*, http://www.sigdemaurex.com/English/Products_E/Robot_E/Robot_E.htm . one page.

Tsai, Lung-Wen, *Chapter 9 Robotic Mechanisms*, pp. 221-235 and 243-247.

Hunt, K.H., *Structural Kinematics of In-Parallel-Actuated Robot-Arms*, Journal of Mechanisms, Transmissions, and Automation in Design, pp. 705-712, vol. 105, Dec. 1983.

* cited by examiner

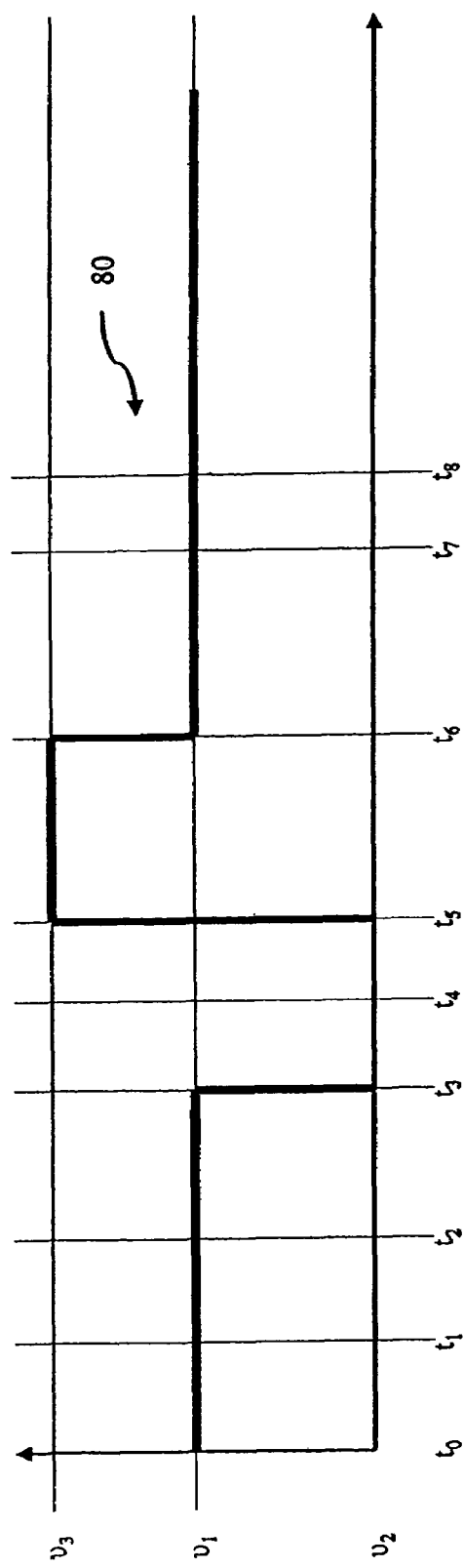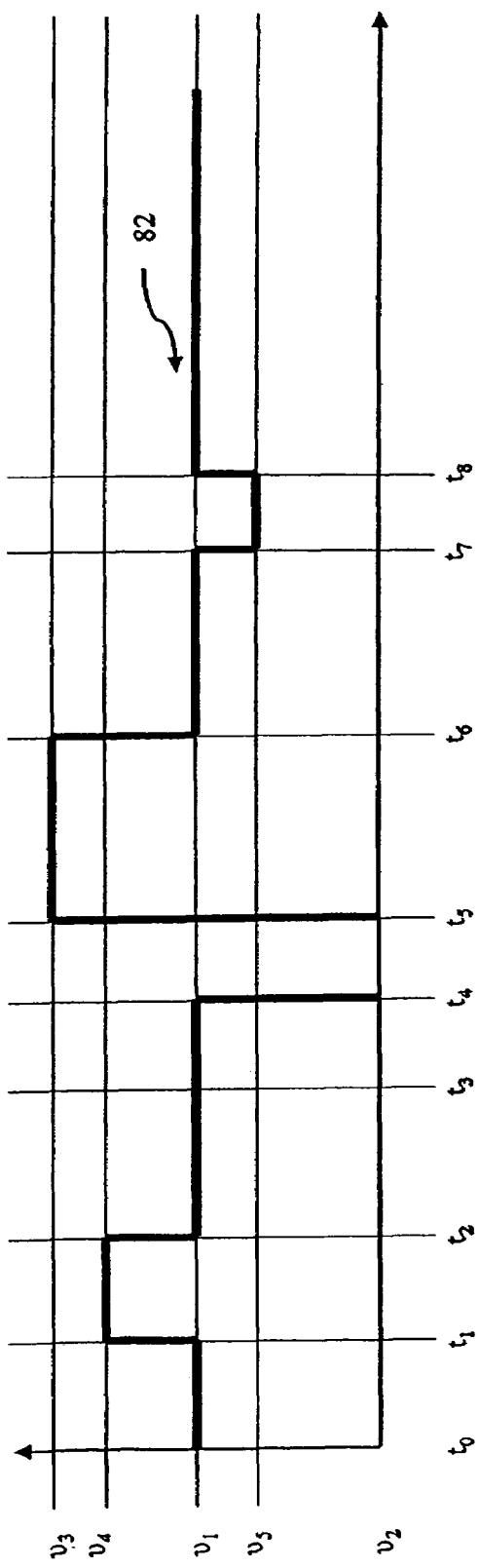

TRANSPORT SYSTEM

CROSS-REFERENCE TO RELATED APPLICATIONS

This application is a continuation of U.S. patent application Ser. No. 10/678,708, filed Oct. 3, 2003, now abandoned and having the title A TRANSPORT SYSTEM, the disclosure of which is expressly incorporated herein by reference.

BACKGROUND AND SUMMARY OF THE INVENTION

The present invention relates to transporters, such as conveyor systems, and in particular to transporters used in the food industry.

Many types of products are transported by transporters, such as conveyor systems. For instance, in the food industry prepared food items, such as pizzas, entrees, and desserts, are assembled from various component pieces, including foodstuffs and packaging, which are transported by one or more transporters. Further, the finished product and/or the component pieces are often transported on or by multiple transporters, such as by a first transporter and then by a second transporter.

The creation of the finished product from the component pieces often requires that the component pieces be brought together at certain times. As such, it is desirable to control the spacing and/or positioning of the component pieces on a given transporter to ensure adequate processing of the component pieces to form the product.

Further, some component pieces are provided in bulk. As such, it is desirable to accept a bulk amount of a given component piece and to subsequently arrange the individual component pieces such that the individual component pieces may be transported in a somewhat ordered manner, such as a single layer of the individual component pieces on a transporter.

In one exemplary embodiment, a transport control system is provided that is configured to control the spacing and/or orientation of the individual component pieces of a product which are to be transported from a first transporter to a second transporter. In another exemplary embodiment, a transport system is provided that is configured to accept individual component pieces of a product in bulk and to arrange the individual component pieces in a somewhat ordered manner, such that the individual component pieces may be presented to a transporter in a somewhat ordered manner. In one example, the individual component pieces are arranged such that the individual component pieces are in a single layer.

In a further embodiment, a transport system for placing a plurality of randomly positioned product on a transporter in a single layer is provided. The transport system includes a first transporter having a first end and a second end and a transport member configured to transport the product from the first end to the second end, a hopper, a drive system coupled to the first transporter, and a control system connected to the drive system. The hopper forming a repository proximate the first end of the first transporter. The repository is adapted to receive a randomly positioned product. The drive system is configured to drive the transport member at a transport speed such that at least a portion of the randomly positioned product is moved from the repository towards the second end of the first transporter. The control system is configured to control the transport speed. The control system includes a first sensor positioned to monitor the presence of a first one of the product in an output region proximate to the second end of the transport member and a controller connected to first sensor. The controller is configured to set the transport speed generally equal to a baseline speed when the first one of the product is detected in the output region and to deviate the transport speed from the baseline speed when the first one of the product is not detected in the output region. In one variation the transport system further includes a product rake configured to block a second one of the product stacked on top of the first one of the product from being transported to the output region.

In a first exemplary method, a method of transporting a plurality of randomly positioned product from a hopper to a first region of a transporter, such that the plurality of randomly positioned product is placed on the transporter in a single layer is provided. The method includes the steps of transporting a portion of the plurality of product on a feed transporter from the hopper towards the transporter, blocking a first one of the portion of the product as it is being transported by the feed transporter such that a single layer of product remains on the feed transporter, the first one of the product being stacked upon a second one of the product, monitoring the first region of the transporter to determine if a third one of the product is currently present in the first region, and moving the second one of the product from the feed transporter to the first region of the transporter if the third one of the product is not currently detected in the first region.

In another exemplary method, a method of controlling the placement of at least one of a plurality of product from a first transporter moving at a transport speed and having an output region to a second transporter moving at a baseline speed and having an input region is provided. The method includes the steps of setting the transport speed generally equal to the baseline speed in the absence of an event, monitoring at least one of the output region and the input region for the occurrence of an event, wherein an event corresponds to one of the detection of the presence of or absence of a first one of the product in one of the output region of the first transporter and the input region of the second transporter, and deviating the transport speed from the baseline speed upon a detection of an event.

In yet a further exemplary embodiment, a transport control system for controlling the placement of at least one of a plurality of product from a first transporter to a second transporter, the first transporter having an output region and a first drive system to drive the first transporter at a transport speed and the second transporter having an input region and a second drive system to drive the second transporter at a baseline speed is provided. The transport control system includes a first sensor configured to detect the presence of the product and is positioned to detect the presence of the product within the output region of the first transporter, a second sensor configured to detect the presence of the product and is positioned to detect the presence of the product within the input region of the second transporter, and a controller is connected to the first sensor and the second sensor, the controller is configured to control the transport speed of the first transporter based at least on one of a first input signal from the first sensor and a second input signal from the second sensor, wherein the controller increases the transport speed above the baseline speed of the second transporter when the first input signal indicates that a first one of the product is not present in the output region of the first transporter.

In yet another exemplary embodiment, a transport system for placing a plurality of randomly positioned product onto a transporter is provided. The transport system including a first transport system configured to receive the randomly positioned product and to organize the randomly positioned product into a single layer, the first transport system having a first end and a second end; a first product mover configured to move a first portion of the product from the first transport system to the transporter, the first product mover positioned between the first end and the second end of the first transport system; a second transport system configured to receive a second portion of the product from the first transport system not moved by the first product mover, the second transport system positioned adjacent the second end of the first transport system; and a second product mover configured to move at least a portion of the second portion of the product from the second transport system to the transporter.

In still a further exemplary method, a plurality of randomly positioned product are moved to a transporter, such that each individual product is positioned in a respective tray transported on the transporter by a method including the steps of receiving a plurality of randomly positioned product; arranging the product into a single layer; transporting the product; moving a first portion of the product to the trays on the transporter; collecting a second portion of the product; arranging the second portion of the product into a single layer; transporting the second portion of the product; and moving the second portion of the product to the trays on the transporter.

BRIEF DESCRIPTION OF THE DRAWINGS

FIG. 3A is an exemplary timing diagram of the baseline speed of the second transporter of FIG. 1;

FIG. 3B is an exemplary timing diagram of the transport speed of the first transporter of FIG. 1 for the same time period of the timing diagram of FIG. 3A;

DETAILED DESCRIPTION

Figure 1:
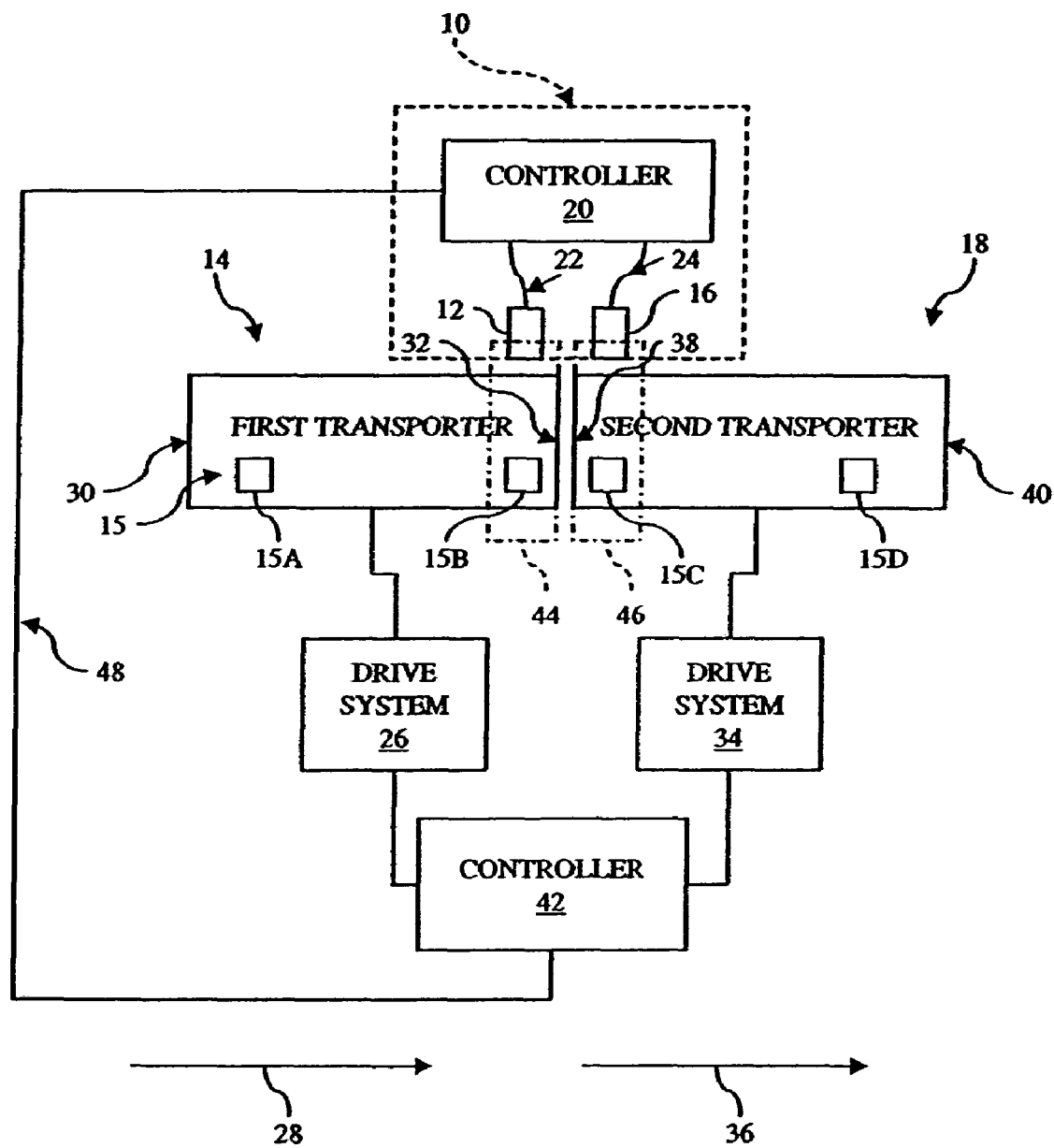
FIG. 1 is an exemplary transport control system along with a first transporter and a second transporter.

Referring to FIG. 1, an exemplary transport control system 10 is shown along with a first transporter 14 and a second transporter 18. Transport control system 10 controls the transition of a product from first transporter 14 to second transporter 18, such as individual products 15A, 15B, 15C, and 15D. Transport control system 10 may be used to control the positioning and spacing of products 15A, 15B, 15C, 15D. For example, transport control system 10 by controlling when one of products 15A, 15B, 15C, 15D is transported from first transporter 14 to second transporter 18 may prevent a given individual products 15A, 15B, 15C, 15D from being placed on top of or adjacent to a previously transported product of individual products 15A, 15B, 15C, 15D.

Transport control system 10 includes a first sensor 12 configured to detect the presence of product 15 to be transported on first transporter 14, a second sensor 16 configured to detect the presence of product 15 to be transported on second transporter 18, and a controller 20 connected to first sensor 12 and second sensor 16. Controller 20 is connected to first sensor 12 and second sensor 16 through either one or more wired connections, such as wired connections 22 and 24, through one or more wireless connections (not shown), or through one or more wired and one or more wireless connections.

First transporter 14 includes a drive system 26, such as a motor, which drives first transporter 14 such that the product, such as products 15A and 15B, is transported or otherwise moved along a path 28, shown as a linear direction, generally at a given speed. In one example, first transporter 14 is a conveyor system and includes one or more belts, rollers, tracks, chains or other suitable means for supporting and transporting product 15. As such, first transporter 14 transports product 15 generally from a first end 30 towards a second end 32.

Second transporter 18 includes a drive system 34, such as a motor, which drives second transporter 18 such that the product, such as product 15C and 15D, is transported or otherwise moved along a path 36, shown as a linear direction, generally at a given speed. In one example, transporter 18 is a conveyor system and includes one or more belts, rollers, tracks, chains or other suitable means for supporting and transporting product 15. As such, second transporter 18 transports product 15 generally from a first end 38 towards a second end 40. In an alternative embodiment, the first transporter 14 and the second transporter 18 are each driven by a common drive system.

Paths 28 and 36 are shown in FIG. 1 to be generally parallel and oriented in the same direction. However, paths 28 and 36 may be angled relative to each other, either vertically, horizontally, or a combination of vertically or horizontally. In one example, paths 28 and 36 are generally horizontal and path 36 is perpendicular to path 28. In another example, path 28 is angled upward relative to path 36, such that product 15 is raised by first transporter 14 from first end 30 to second end 32 and transported to second transporter 18 which is at a higher elevation than first end 30 of first transporter 14.

Further, paths 28 and 36 may be parallel, but oriented in opposite directions, for instance second transporter 18 may return product 15 received from first transporter 14 back towards first end 30 of first transporter 14. Additionally, although paths 28 and 36 are shown generally to be linear paths, each can be comprised of path components moving in various directions. For example, path 36 may be comprised of a linear path component followed by a curved component followed by an inclined linear component.

Drive systems 26 and 34 of first transporter 14 and second transporter 18, respectively, are controlled by a controller 42. Controller 42 at least controls the speed at which first transporter 14 and second transporter 18 are driven by respective drive systems 26 and 34 and in turn the speed at which first transporter 14 and second transporter 18 transport product 15. In one example, controller 42 includes at least one of software or firmware configured to control at least the speed of first transporter 14 and second transporter 18.

Controller 42 may also control other parameters of first transporter 14 or second transporter 18, such as the speed of a product rake (for example product rake 260 of in FIG. 6), or parameters of additional components associated with either of first transporter 14 or second transporter 18, such as the operation of container or product dispensers, product placers, ovens, or other devices known to those skilled in the art. An example product dispenser is an apparatus configured to place a sauce on a pizza crust product, such as the apparatus disclosed in U.S. Pat. No. 5,318,629, issued on Jun. 7, 1994 and assigned to Raque Foods, the disclosure of which is hereby expressly incorporated by reference.

An example product placer is product placer or mover 136, described below in connection with FIG. 5. One example of a product placer is Model No. SIG XR22 Delta Robot and available from SIG Pack Systems AG located at CH-8222 Beringen Switzerland. Additionally, a suitable product mover and associated controller is disclosed in U.S. Pat. No. 4,976,582, issued Dec. 11, 1990, and entitled "Device for the movement and positioning of an element in space," the disclosure of which is expressly incorporated by reference. A further suitable product mover and associated controller is disclosed in U.S. Pat. No. 6,543,987, issued Apr. 8, 2003, entitled "Robot for handling products in a three-dimensional space," and assigned to SIG Pack Systems AG, the disclosure of which is expressly incorporated by reference.

Controller 20 of transport control system 10, receives a sensing signal from first sensor 12 over connection 22 indicating the presence or absence of product 15 within a region 44 being monitored by first sensor 12 and a sensing signal from second sensor 16 over connection 24 indicating the presence or absence of the product being transported within a region 46 being monitored by second sensor 16. Regions 44 and 46 may include generally a line to be monitored, generally a plane to be monitored, or generally a three-dimensional volume to be monitored. The sensing signals can be one of one or more analog voltage signals, one or more analog current signals, and/or one or more digital signals.

In one embodiment, first sensor 12 and second sensor 16 each includes an emitter positioned on a first lateral side of the respective transporter 14, 18 and a detector or receiver positioned on the other lateral side of the respective transporter 14, 18. The presence of product 15 between the emitter and detector pair of either first sensor 12 and second sensor 16, prevents the respective detector from detecting the signal from the emitter indicating the presence of product 15. In another embodiment, at least one of first sensor 12 and second sensor 16 includes multiple sensors configured to detect the presence of product 15 in one or more regions. In a further embodiment, the first sensor and the second sensor are cameras or machine vision systems.

Controller 20 generates a control signal which is provided to at least one of drive system 26, drive system 34, and controller 42 based at least in part on one or more sensing signals received from first sensor 12 and/or second sensor 16. The control signal can be one of one or more analog voltage signals, one or more analog current signals, and/or one or more digital signals. Controller 20 includes at least one of software and firmware programmed or configured to generate the control signal based at least in part on one or more sensing signals received from first sensor 12 and/or second sensor 16.

In the illustrated embodiment, controller 20 is connected to controller 42 over a wired connection 48. In another embodiment, controller 20 is connected to controller 42 through a wireless connection or a combination of a wired connection and a wireless connection. In a further embodiment, controller 20 is connected to at least one of drive system 26 and drive system 34. In still a further embodiment, controller 20 and controller 42 are incorporated into a single controller.

The control signal generated by controller 20 is used in setting the speed at which at least one of drive system 26 and drive system 34 drives the respective transporter 14, 18. The control signal can be further used to control additional parameters of first transporter 14, second transporter 18, and/or components associated with one of first transporter 14 or second transporter 18. In one example, the speed a respective transporter 14, 18 is driven is independent of the speed of the other respective transporter 14, 18. In another example, the speed of one of transporters 14, 18 is based at least in part on the speed of the other of transporters 14, 18.

Figure 2:
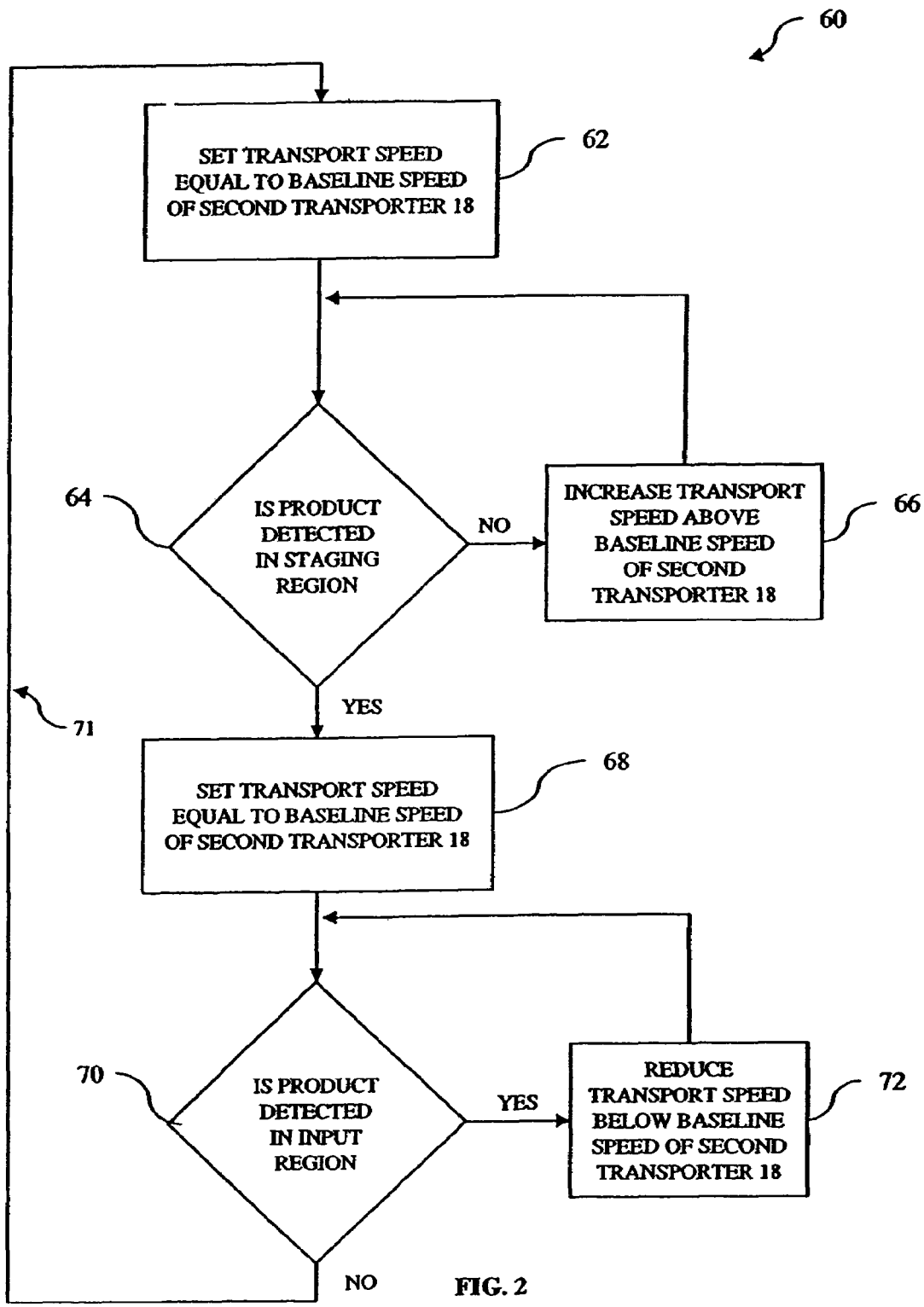
FIG. 2 is a flowchart of an exemplary transport control routine.

Referring to FIG. 2, a flowchart is shown of an exemplary control routine 60 executed by controller 20 to control the speed at which first transporter 14 transports product 15 on path 28, here in after referred to as the transport speed. In the example shown in FIG. 2, the transport speed of first transporter 14 is based at least in part on the speed of second transporter 18. However, as discussed above it is contemplated that the transport speed of first transporter 14 may be independent of second transporter. Further, the transport speed of first transporter 14 may be dependent upon other or additional parameters or inputs.

Control routine 60 is configured to prevent the transition or transport of product 15 from first transporter 14 to second transporter 18 if there is not an open location to receive product 15. As such, control routine 60 prevents product from being placed on top of existing product and/or otherwise contacting existing product. As explained below, control routine 60 is further configured to alter the transport speed to increase the likelihood that product 15 is positioned within output or staging region 44 of first transporter 14 ready to be transported to second transporter 18.

As represented by block 62, a first control signal is generated by controller 20 to drive first transporter 14 at the baseline speed of second transporter 18. Controller 20 may either directly control the transport speed by controlling drive system 26 or provide an indication of the transport speed to controller 42 which in turn controls drive system 26. The baseline speed of second transporter 18 is the default transport speed assigned to first transporter 14 in the absence of an event to trigger a deviation from the baseline speed, such as one of an increase in transport speed above the baseline speed, a reduction in transport speed below the baseline speed, or a transport speed equal to zero.

The baseline speed of second transporter 18 in one example is a constant speed. In another example, the baseline speed of second transporter 18 is a non-constant speed. In yet another example, the baseline speed of second transporter 18 is a constant speed in the absence of an event to trigger one of an increase in speed above the baseline speed, a reduction in speed below the baseline speed, or a speed equal to zero.

Controller 20 monitors whether first sensor 12 detects the presence of product 15 in output or staging region 44 as represented by block 64. The absence of product 15 detected by first sensor 12 within output region 44 is a first event which results in controller 20 generating a control signal to increase the transport speed above the baseline speed, as represented by block 66. Once product 15 is detected by first sensor 12 within output region 44, controller 20 generates a control signal to return the transport speed to the baseline speed, as represented by block 68.

Controller 20 further monitors whether second sensor 16 detects the presence of product 15 in region 46, an input region of transporter 18, as represented by block 70. The presence of product 15 detected by second sensor 16 within input region 46 is a second event which results in controller 20 generating a control signal to reduce the transport speed below the baseline speed to a reduced transport speed, as represented by block 72. If product is not detected in input region 46, then controller 20 returns or maintains the transport speed to the baseline speed, as represented by the return connection 71 to block 62.

The reduced transport speed in one example is zero. In another example, the reduced transport speed is a function of the baseline speed and a general knowledge of the size of product 15. For example, by knowing the baseline speed and the general size of product 15, controller 20 may calculate the time (t) required for product 15 to exit region 46 and hence calculate a reduced transport speed which will result in product 15 in output region 44 being transitioned to the input region 46 at the calculated time (t).

As stated above, the baseline speed of second transporter 18 may be governed by one or more inputs, may be constant, or may vary over time in response to one or more inputs or may operate at a given speed profile. Referring to FIGS. 3A and 3B, an exemplary baseline speed profile of second transporter 18 and an exemplary transport speed profile of first transporter 14 are shown. FIG. 3A shows an exemplary baseline speed profile of second transporter 18 over a period of time. FIG. 3B shows an exemplary transport speed profile of first transporter 14 over the same period of time. It should be noted that although the profiles in FIGS. 3A and 3B are shown generally as instantaneous changes in speed, the changes in speed preferably are more gradual.

Referring to FIG. 3A, an exemplary baseline speed profile 80 for second transporter 18 is shown. As shown in FIG. 3A, the baseline speed of second transporter 18 is a first speed ($v_1$) until a time ($t_3$). At time ($t_3$) the baseline speed drops to a second speed ($v_2$), in the present illustration speed ($v_2$) is zero, i.e. second transporter 18 is paused. At a time ($t_5$) the baseline speed is raised to a third speed ($v_3$) which is greater than first speed ($v_1$). At a time ($t_6$) the baseline speed returns to first speed ($v_1$).

Referring to FIG. 3B, an exemplary transport speed profile 82 for first transporter 14 is shown. In the absence of any events, transport speed profile 82 would be generally identical to baseline speed profile 80 of FIG. 3A. However, the occurrence of an event results in a deviation between transport speed profile 82 and baseline speed profile 80. Referring to FIG. 3B, at time ($t_0$) the transport speed profile is set at speed $v_1$ equal to the baseline speed at ($t_0$). At a time ($t_1$) in response to an event, such as the absence of product 15 in output region 44, controller 20 increases the transport speed of first transporter 14 above the baseline speed to a fourth speed ($v_4$). At a time ($t_2$) controller 20 reduces the transport speed back to the baseline speed, which is at speed ($v_1$) at time ($t_2$), in response to product 15 being detected in output region 44. At time ($t_3$) transport speed normally would be reduced to speed ($v_2$) since baseline speed 80 is reduced to speed ($v_2$). However, at time ($t_3$), the transport speed remains at speed ($v_1$) in response to an event, such as the absence of product 15 in output region 44.

At a time ($t_4$) the transport speed of first transporter 14 is reduced to speed ($v_2$), the baseline speed, in response to product 15 being detected in output region 44. As such, at time ($t_4$) both of first transporter 14 and second transporter 18 are stopped or paused ($v_2$=0). At a time ($t_5$) the transport speed of first transporter 14 is raised to a speed ($v_3$) because the baseline speed of the second transporter 18 is raised to speed ($v_3$). At time ($t_6$) the transport speed of first transporter 14 is reduced to speed ($v_1$) because the baseline speed of second transporter 18 is lowered to speed ($v_1$). At a time ($t_7$) the transport speed of first transporter 14 is lowered to a fifth speed ($v_5$) in response to an event, the detection of the presence of product 15 in output region 44 by first detector 12 and in input region 46 by second detector 16. At a time ($t_8$) the transport speed of first transporter 14 is returned to the baseline speed due to the absence of product 15 in input region 46 of second transporter 18.

Figure 4:
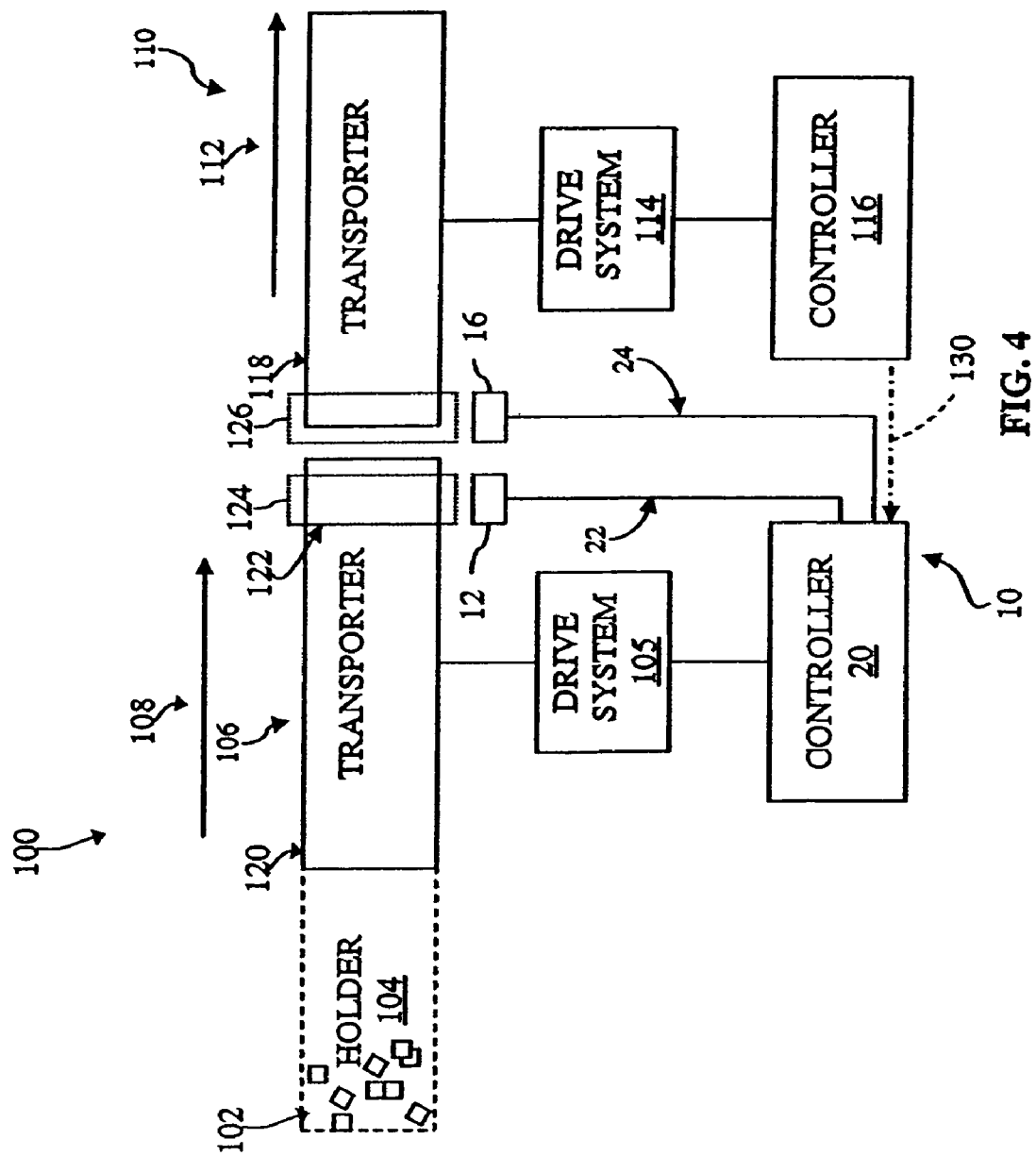
FIG. 4 is an exemplary transport system including the transport control system of FIG. 1, the transport system being positioned proximate to a transporter.

Referring to FIG. 4, transport control system 10 is incorporated into a feed transport system 100. Feed transport system 100 is configured to take a plurality of randomly placed product 102 positioned in a holder 104, transport product 102 on transporter 106 generally along a path 108, and to position product 102 on a second transporter 110. Transporter 106 is driven by a drive system 105, such as a motor. Transporter 106 is controlled, directly or indirectly, by a controller 20. In one example, transporter 106 is a conveyor system and includes one or more belts, rollers, tracks, chains, or other suitable means for supporting and transporting product 102.

Transporter 110 transports product 102 along a path 112 for further processing. Transporter 110 is driven by a drive system 114, such as a motor. Drive system 114 is controlled, directly or indirectly, by a controller 116. In one example, transporter 110 is a conveyor system and includes one or more belts, rollers, tracks, chains, or other suitable means for supporting and transporting product 102. In one embodiment, controller 20 and controller 116 are combined into a controller.

The transitioning and hence positioning of product 102 on transporter 110 is controlled by transport control system 10 as described in more detail below. In one example, product 102 is positioned on transporter 110 as a single layer of product. Exemplary products include frozen meat portions which are to be packaged as part of a frozen entree. The spacing or density of the single layer of product on transporter 110 is controlled by one or more parameters including the ratio of the transport speed of 106 and the transport speed of transporter 110, the direction of path 108 (degree of incline, if any), and the speed of a product rake, if included (see FIG. 6).

As previously described, transport control system 10 includes controller 20, first sensor 12 and second sensor 16. Controller 20, either directly or indirectly, based at least in part on the sensing signals from first sensor 12 and second sensor 16, controls the speed at which drive system 105 drives transporter 106, hereinafter the feed transport speed. Controller 20 may further control additional parameters of feed system 100 and/or parameters of transporter 110. In alternative embodiments, controller 116 of the transporter, based at least in part on the sensing signals from first sensor 12 over connection 22, and second sensor 16 over connection 24, controls drive system 105 and hence the feed transport speed.

As discussed above, transport control system 10 controls the transition of product, such as product 102, to be transported from a first transporter, such as transporter 106, to a second transporter, such as transporter 110. Transport control system 10 is used to control the positioning and spacing of product 102.

Returning to FIG. 4, feed transport system 100 is positioned proximate to a first end 118 of transporter 110, such that product 102 may be transported from a first end 120 of transporter 106 along path 108 to a second end 122 of transporter 106 and subsequently be received at first end 118 of transporter 110. Feed transport system 100 is further positioned or at least sensors 12, 16 are positioned such that sensor 12 is monitoring or detecting the presence of product 102 within an output region 124 of feed system 100 and sensor 16 is monitoring or detecting the presence of product 102 within an input region 126 of transporter 110.

In one embodiment, the feed transport speed of transporter 106 is determined by controller 20 independent of the speed of transporter 110. As such, a baseline speed of the feed transport speed and adjustments from the baseline speed are independent of the speed of transporter 110. In a preferred embodiment, the feed transport speed of transporter 106 is determined at least in part based on the speed of transporter 110. As such, the speed of transporter 110 or the speed of transporter 110 multiplied by a weight factor, such as 70% or 110%, is considered to be a baseline speed for the feed transport speed of transporter 106. The baseline speed is one of a constant speed, a variable speed, or a constant speed in the absence of an event.

In a preferred embodiment, controller 20 executes control routine 60 of FIG. 2 to determine the feed transport speed of transporter 106 based on feedback of the baseline speed of transporter 110. In one example, the baseline speed of transporter 110 is communicated to controller 20 from controller 116 over a connection 130. Connection 130 is one of one or more wired connections, one or more wireless connections, or a combination of one or more wired connections and of one or more wireless connections. In another example, the baseline speed of transporter 110 is determined by feed transport system 100 from a sensor configured to detect the speed of transporter 110, such as a velocity sensor.

Figure 5:
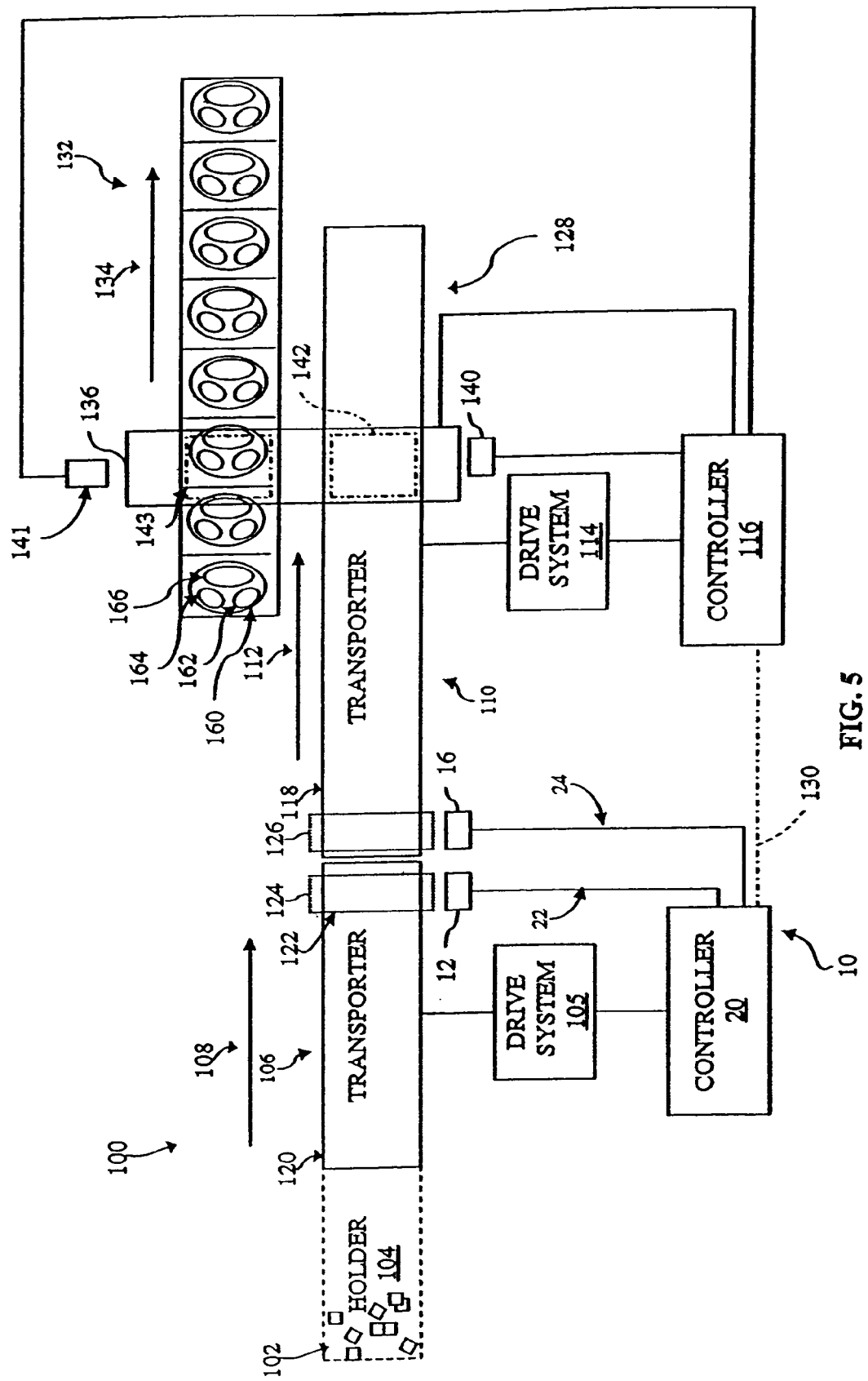
FIG. 5 is the transport system of FIG. 4 positioned proximate to a second transporter and a third transporter.

Referring to FIG. 5, an example situation wherein the baseline speed of transporter 110 is a variable speed is shown. In FIG. 5, product 102 that is transported by transporter 110 generally along path 112 is transported to an additional transporter 132 to be transported generally along a path 134 by a product mover 136. In one example, product 102 is a food product, such as frozen chicken or pork, which is transported by product mover 136 to a tray 160 being transported by transporter 132. Tray 160 is illustratively shown as having three compartments 162, 164, 166 each configured to receive one or more food items, such as an entree, a vegetable, or a dessert. Product mover 136 includes a sensor 141 generally similar to sensor 140, configured to monitor a region 143 of transporter 132. Product mover 136 through sensor 141 detects the presence of a tray 160 within region 143 and positions a product 102 into entree compartment 166 or other designated location. Further, in one example, product mover 136 orients product 102 relative to tray 160 in addition to placing product 102 in tray 160.

An example product mover 136 is a robot configured to pick-up or otherwise handle product 102, transport product 102 to transporter 132, and in some examples orient product 102. In a preferred example, product mover 136 is Model No. SIG XR22 Delta Robot available from SIG Pack Systems AG located at CH-8222 Beringen, Switzerland. Additionally, a suitable product mover and associated controller is disclosed in U.S. Pat. No. 4,976,582, issued Dec. 11, 1990, the disclosure of which is expressly incorporated by reference. A further suitable product mover and associated controller is disclosed in U.S. Pat. No. 6,543,987, issued Apr. 8, 2003 and assigned to SIG Pack Systems AG, the disclosure of which is expressly incorporated by reference.

The movements of product mover 136 are controlled by a controller, such as controller 116. An exemplary controller is SIG XMC available from SIG Pack Systems AG. Product mover 136 is able to locate product 102 on transporter 110 through the use of a sensor 140 configured to monitor a region 142 of transporter 110. Sensor 140 is connected to controller 116. In one example, sensor 140 is a machine vision system, such as SIG XMV Vision System, available from SIG Pack Systems AG. As is known in the art, based on the output of sensor 140, the position of product mover 136 is adjusted within region 142 to pick up or otherwise handle product 102.

Further, based on the number of products 102 in region 142 or the presence or absence of product 102 in region 142, controller 116 may adjust the baseline speed of transporter 110. For instance, if no product is detected in region 142 by sensor 140, controller 116 may increase the speed of the baseline speed over a default baseline speed. Conversely, if multiple products 102 are detected within region 142 by sensor 140, controller 116 may decrease the speed of the baseline speed of transporter 110 or pause transporter 110. As explained above and in detail with respect to FIGS. 2, 3A, and 3B, changes in the baseline speed result in changes in the feed transport speed in the absence of an event.

As discussed below in connection with FIGS. 13–16 it is contemplated that feed system 100 position a high density of product on transporter 110 and the speed of transporter 110 is such that product mover 136 is able to operate at a high capacity wherein a high number of product 102 is placed by product mover 136. In addition, the speed of transporter 110 is not adjusted to ensure that product 102 does not advance past product mover 136. As such, product mover 136 is able to place a high capacity of product 102 on transporter 132 and excess product 102 is further transported by transporter 110 along path 108.

Referring to FIGS. 6–9, an exemplary feed transport system 200 is shown. Feed transport system 200 includes a frame 202, a transporter 204 supported by frame 202 and driven by a drive system, motor 206. Feed transport system 200 further includes a holder, hopper 208, for receiving product, such as product 150 (shown in FIGS. 11A–11C), in bulk.

Figure 6:
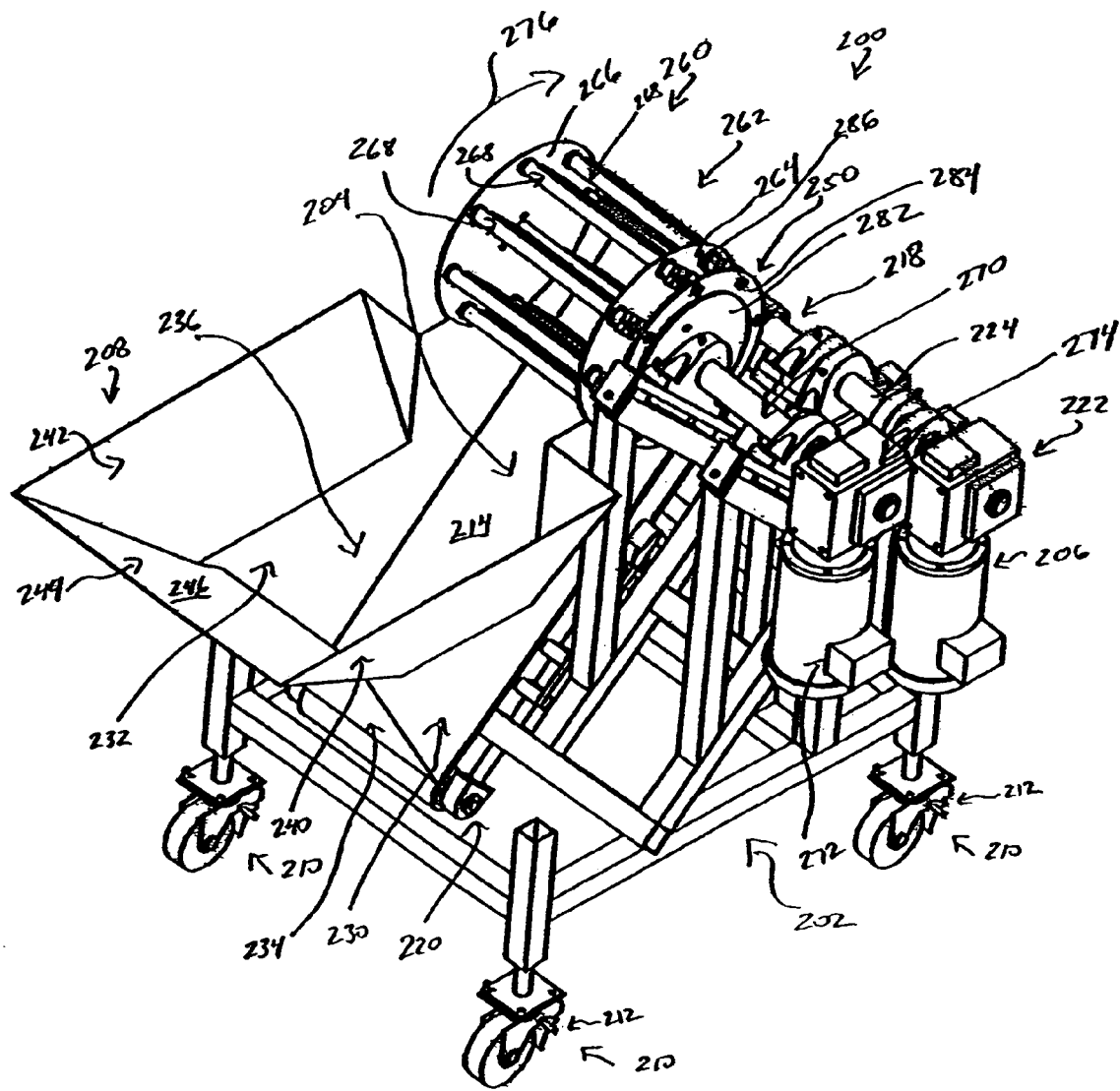
FIG. 6 is an isometric view of an exemplary transport system.
Figure 7:
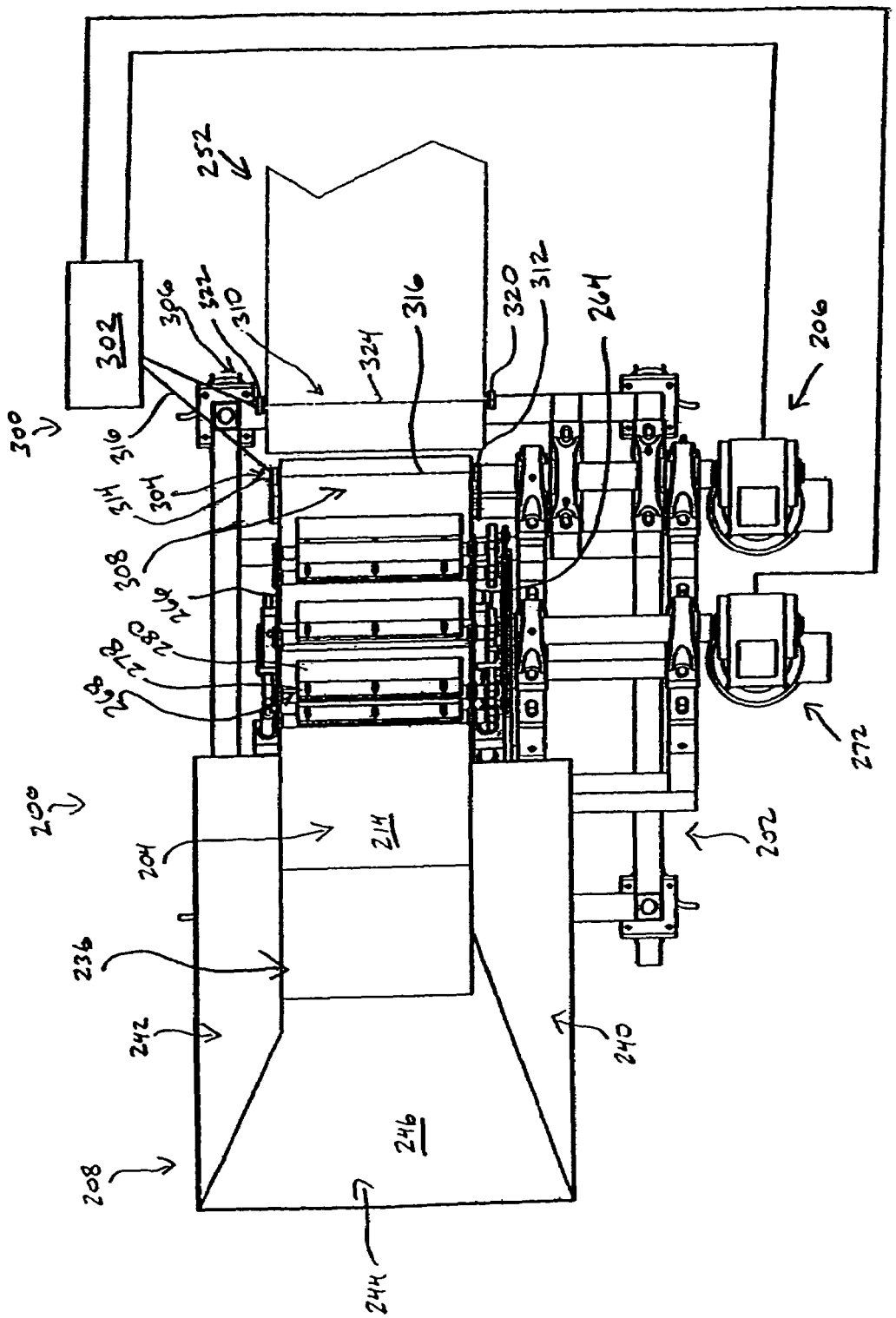
FIG. 7 is a top view of the transport system of FIG. 6.
Figure 8:
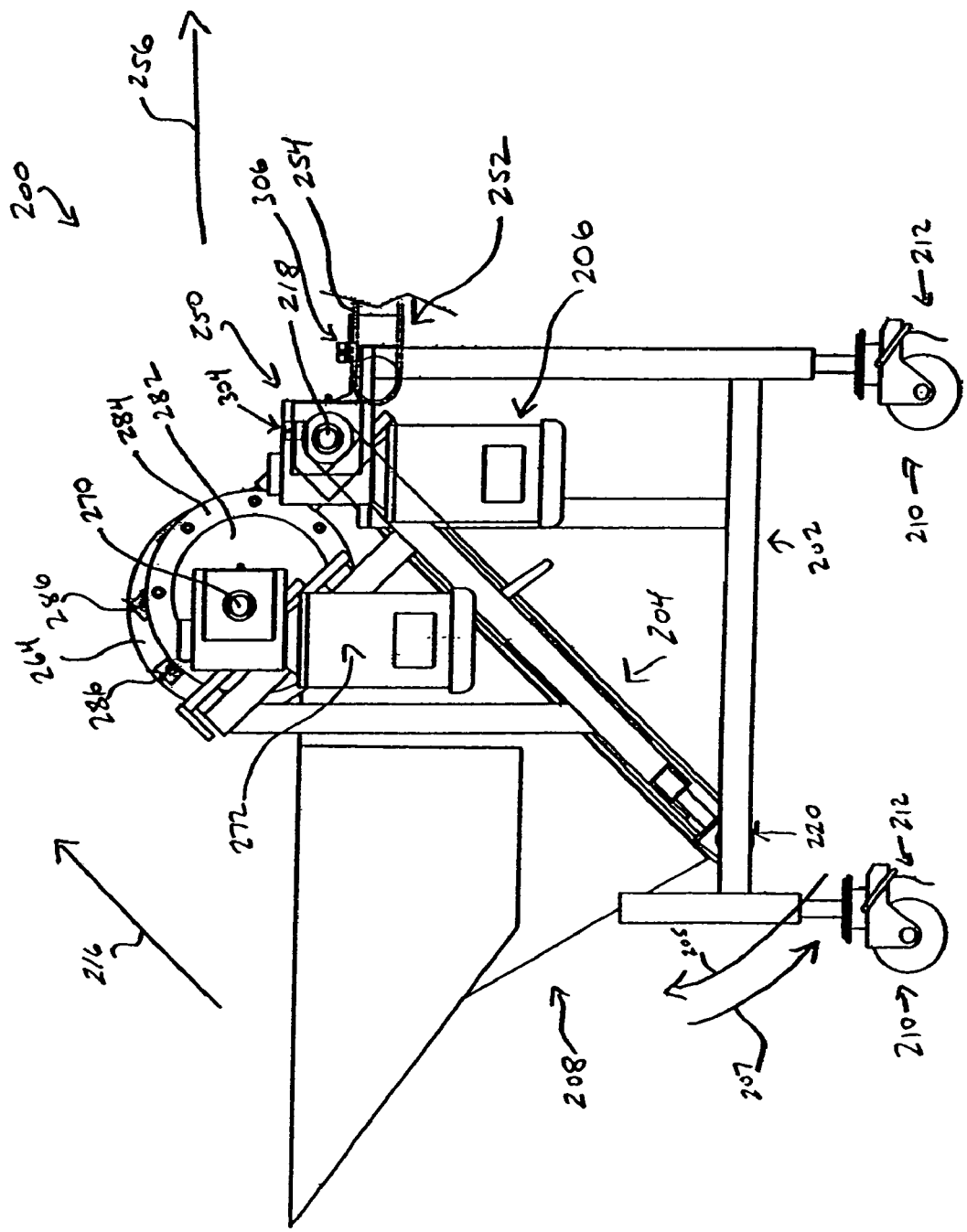
FIG. 8 is a side view of the transport system of FIG. 6.

Feed system 200 is a portable unit that may be moved from location to location on wheels 210. At least one of wheels 210 includes a brake 212 to lock the location of feed system 200 once feed system 200 has been properly located. As shown in FIGS. 6 and 8, multiple wheels 210 include a respective brake 212. In alternative embodiments, the feed transport system 200 is locked or secured in a location by coupling the feed transport system to a frame (not shown) of a transporter 252 (FIGS. 7 and 8).

Transporter 204 of feed transport system 200 is a conveyor system and includes a belt 214 moving in the direction of arrow 216, shown in FIG. 8. Belt 214 is supported by a drive roller 218 and a head roller 220. Drive roller 218 is coupled to motor 206 through a gearbox 222 and a drive shaft 224. Drive roller 218 is configured to move belt 214 generally in the direction of arrow 216.

Figure 11A:
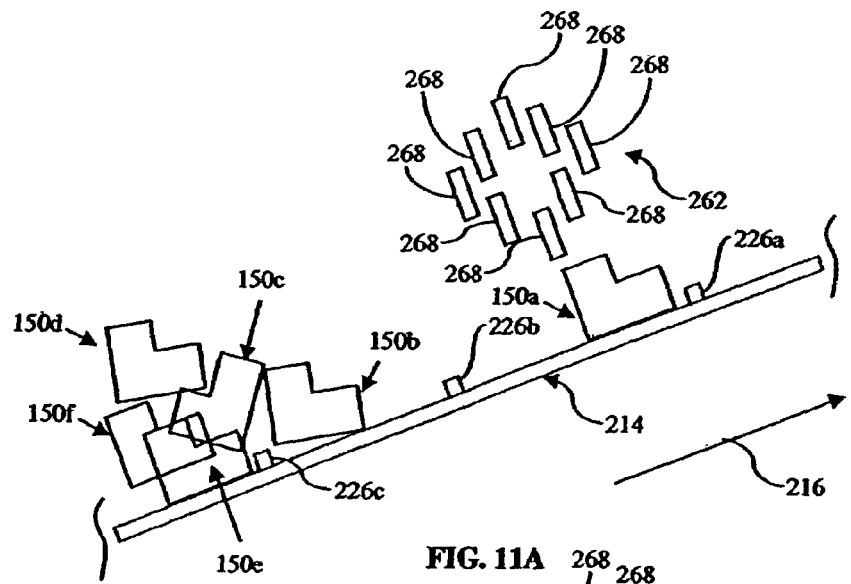
FIGS. 11A, 11B, and 11C illustrate the operation of a product rake of the exemplary transport system of FIG. 6.
Figure 11B:
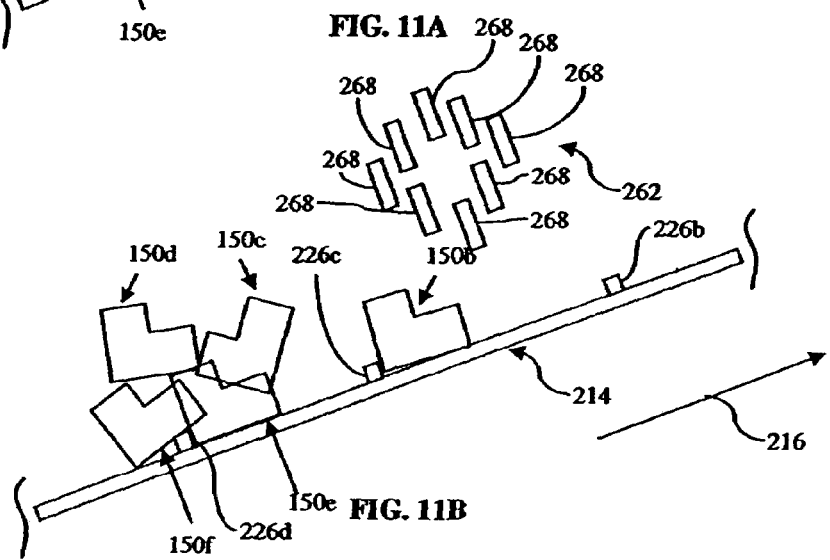
Figure 11C:
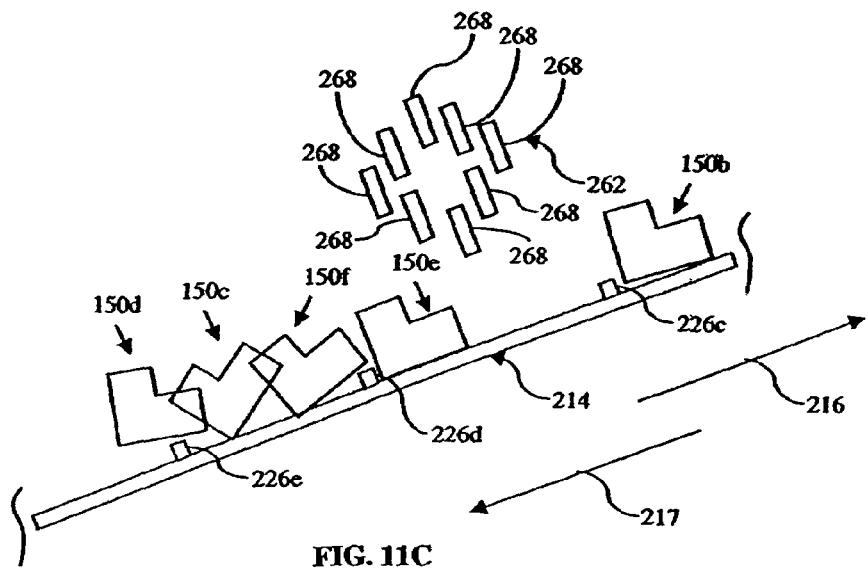

In one example, belt 214 is a cleated belt having a plurality of cleats, such as representative cleats 226 shown in FIGS. 11A–11C. Cleats 226 engage product 150 and assist the movement of product 150 generally in direction 216. In alternative embodiments, other suitable types of belts, rollers, tracks, chains, or other suitable means for supporting and transporting a product are used.

Returning to FIG. 6, holder 208 includes a first side panel 230, a second side panel 232, and a back panel 234. Panels 230, 232, 234 and belt 214 cooperate to form a repository 236 to hold bulk product 150 for further processing. An upper portion 240, 242, 244 of respective panels 230, 232, 234 is flared outward to provide easier loading of bulk product 150 and a larger capacity for repository 236. For example, a box (not shown) containing bulk product 150 is positioned adjacent ramp surface 246 such that the bulk product slides down ramp surface 246 to either rest on belt 214 in repository 236 or to rest on other bulk product in repository 236.

Referring to FIG. 8, product 150 is transported from holder 208 generally in direction 216 by transporter 204. Once product 150 reaches a first end 250 of transporter 204 adjacent drive roller 218, product 150 is transported onto transporter 252. Transporter 252 is a conveyor system and includes a belt 254 on which product 150 is transported. Transporter 252 transports product 150 away from feed system 200 generally in direction 256.

As shown in FIG. 8, directions 216 and 256 are angled relative to each other. In a preferred example, direction 256 is generally horizontal and direction 216 is upwardly angled, such that product 150 is transported from repository 236 upward towards first end 250. The angle of direction 216 relative to horizontal is chosen such that gravity aids in ensuring that a single layer of product 150 is transported from repository 236 towards first end 250. In one example, the angle is between about 0° to about 45°. In a preferred example, the angle is at least 40°. It is contemplated that transporter 204 is angled at other angles.

In one embodiment, the direction 216 (shown in FIG. 8) of transporter 204 is adjustable. In one example, transporter 204 rotates about one roller 218 in directions 205, 207 (shown in FIG. 12). It should be understood that hopper 208 is configured to allow for the angular adjustment of transporter 204. In one example, transporter 204 fits within hopper 208 and panel 234 is curved about its height to provide a generally constant gap between transporter 204 and hopper 208 as the angle of transporter 204 is adjusted. In another example, panel 234 has an adjustable height to accommodate the angular adjustment of transporter 204. In one embodiment panel 234 has a upper portion (not shown) and a lower portion (not shown) moveable relative to the upper portion. By fixing the position of the lower portion relative to the upper portion the height of panel 234 is set.

Figure 12:
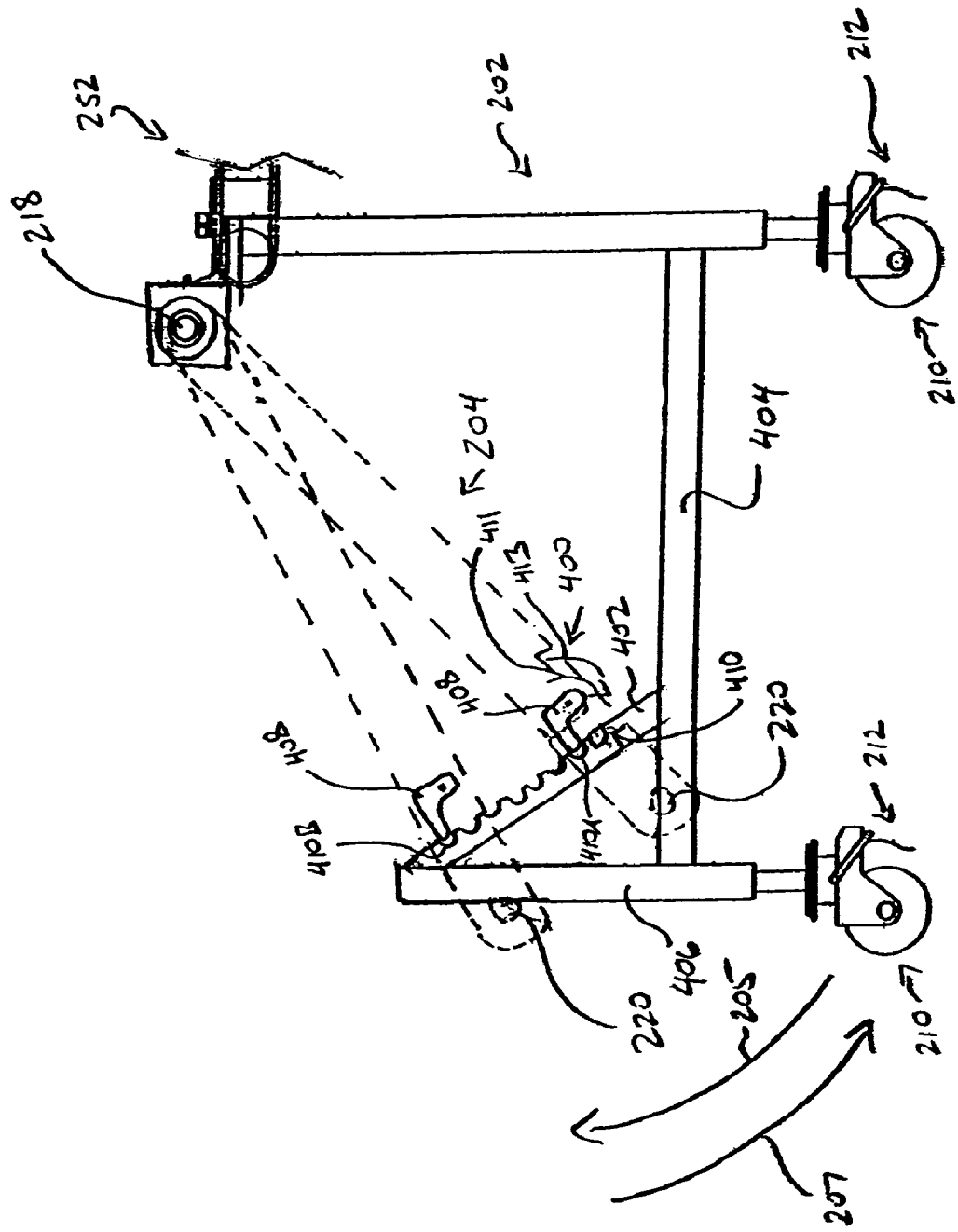
FIG. 12 is a simplified side view of the transport system of FIG. 8 showing an adjuster for adjusting the angle of incline of the transporter.

Referring to FIG. 12, an embodiment of transport system 200 including an adjuster 400 is shown. Adjuster 400 includes a frame member 402 coupled to frame members 404 and 406 and a latch 408. Frame member 402 includes a plurality of recesses or keyways 410 configured to receive a key portion 412 of latch 408 Latch 408 is pivotally mounted to transport 204 and pivots in directions 411, 413. In another example latch 408 is slidably coupled to transporter 204. In a preferred embodiment latch 408 is biased into keyway 410 with a biasing member (not shown), such as a spring.

As shown in FIG. 12 when transport 204 is positioned in a first angled position latch 408 is received in keyway 410a and when transport 204 is positioned in a second angled position latch 208 is received in keyway 410b. In alternative embodiments, an actuator (not shown) is attached to frame 404 and transporter 204 and is controlled by controller 302. Example actuators include screw activators, pneumatic activators and hydraulic activators. The actuator is controlled by controller 302.

Referring to FIG. 6, feed transport system 200 further includes a product rake 260 to aid in ensuring that a single layer of product 150 is presented to transporter 252 from end 250 of transporter 204. Product rake 260 includes a rake assembly 262 comprising a first plate 264, a second plate 266 spaced apart from first plate 264, and a plurality of rake members or paddles 268 pivotably coupled at respective ends to first plate 264 and second plate 266. Rake assembly 262 is supported by a drive shaft 270 coupled to first plate 264 and second plate 266. Drive shaft 270 is driven by a drive system, motor 272, and is connected to motor 272 through a gearbox 274. Drive system 272 drives drive shaft 270 such that rake assembly 262 is rotated in direction 276.

Referring to FIG. 7, paddles 268 include a first portion 278 which is pivotably coupled to first plate 264 and second plate 266 and a second portion 280 coupled to first portion 278. Second portion 280 in one example is comprised of a flexible material. In a preferred embodiment, the material of second portion 280 is sufficiently flexible to not damage product 150 when second portion 280 contacts product 150, yet sufficiently stiff to move or otherwise handle product 150.

Second portion 280 is shown in FIGS. 6–9 as a single complete paddle. However, it is contemplated that second portion 280 is comprised of multiple paddles or teeth. Further, it is contemplated that second portion 280 is made of a rigid material. In one example wherein product 150 is a foodstuff, such as frozen pork chops, second portion 280 is made of stainless steel. Other suitable materials include thermoplastic.

Referring to FIGS. 11A–C, for cleanability and sanitary reasons, it is preferred that rake members 268 maintain an orientation as each member 268 rotates in direction 276 that minimizes the likelihood that portions of product 150 become lodged in rake assembly 262. In the illustrated example, rake members 268 are maintained generally perpendicular to direction 216, see FIGS. 11A–C. In another example, rake members 268 are generally maintained in a vertical orientation.

Figure 9:
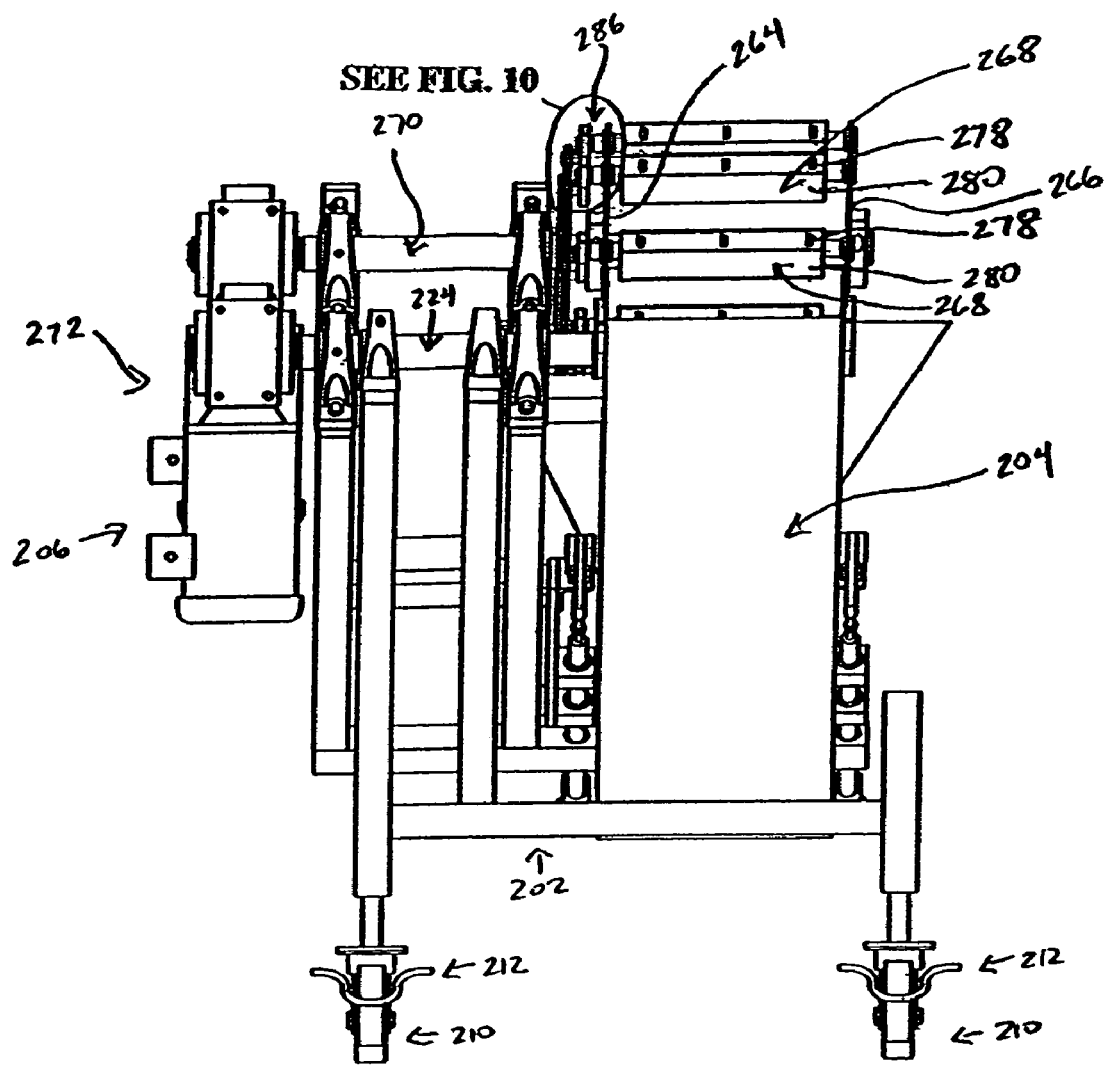
FIG. 9 is a front view of the transport system of FIG. 6.
Figure 10:
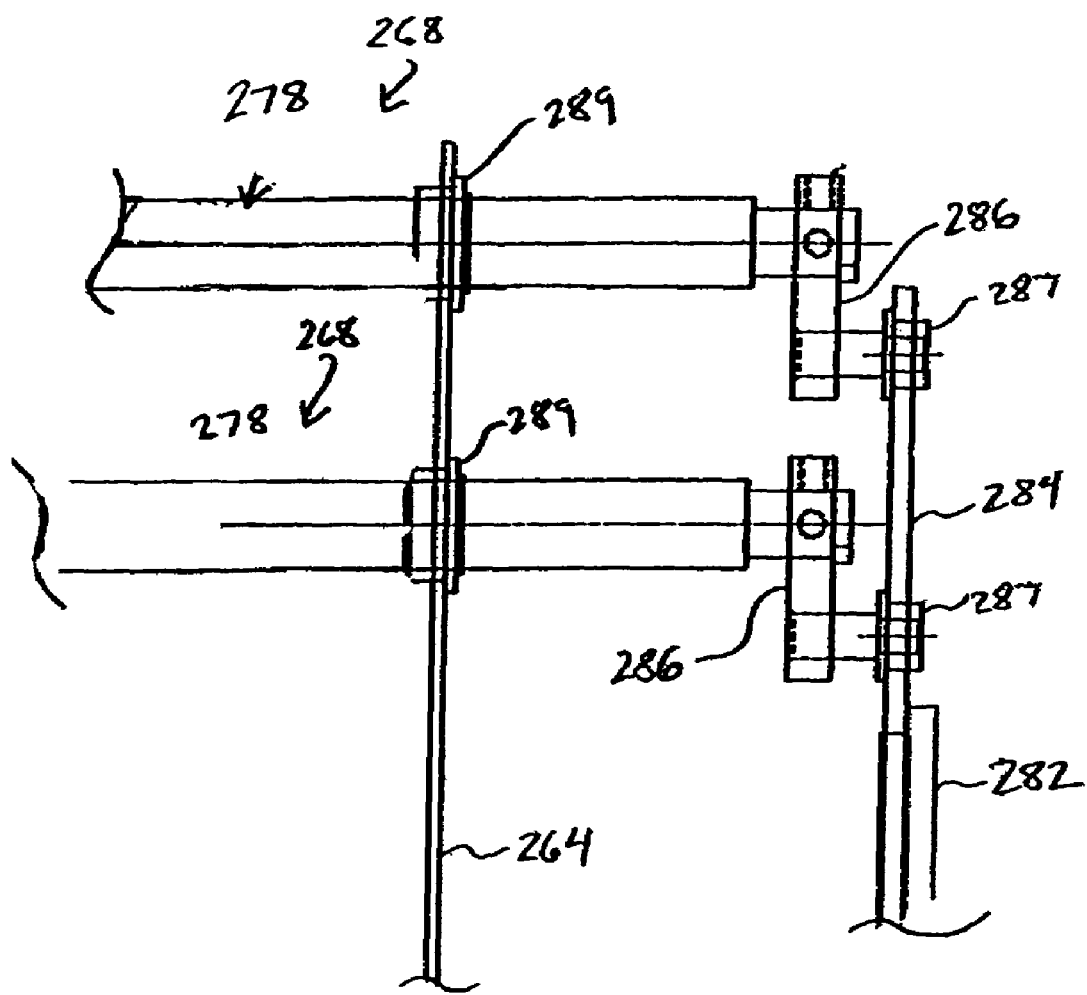
FIG. 10 is a detail view of the links coupling the rake members of a product rake of the transport system of FIG. 6 to a rotating plate.

Referring to FIGS. 9 and 10, the orientation of rake member 268 is maintained with an assembly comprised of a fixed plate 282, a rotating plate 284, and a plurality of links 286. Fixed plate 282 is a circular plate whose center is positioned off-axis from drive shaft 270 (see FIG. 6) of rake assembly 262. Fixed plate 282 is coupled to frame 202 and includes an aperture (not shown) sized to permit drive shaft 270 of rake assembly 262 to pass therethrough.

Referring to FIG. 10, rotating plate 284 is rotatably coupled to fixed plate 282, such that rotating plate 284 rotates about a center of fixed plate 282. Links 286 are each supported by a bushing 287 so that links 286 are rotatably coupled to rotating plate 284. Further, links 286 are fixably coupled to a respective rake member 268. As rake assembly 262 is rotated in direction 276 by drive shaft 270, links 286 and rotating plate 284 are also rotated in direction 276 through the rotation of rake assembly 262.

Since links 286 are fixably coupled to the respective rake member 268, which is supported by a respective bushing 289 so that rake members 268 are rotatable relative to first plate 264 and the length of links 286 are constant, links 286 maintain the orientation of rake members 268 relative to transporter 204. The required length of links 286 and hence the orientation of rake member 268 is controlled by the offset between the centers of fixed plate 282 and the center of rake assembly 262 (drive shaft 270), as well as, the direction of the offset.

By maintaining the orientation of rake members 268 as shown in FIGS. 6 and 8, rake assembly 262 of feed system 200 sanitarily handles food product 150. In alternative embodiments, the rake members are fixably secured to the first plate and second plate of the rake assembly and are radially oriented.

Referring to FIGS. 11A, 11B, and 11C, an example illustration of portions of feed system 200 in operation are shown. Referring to FIG. 11A, at a first time, product 150a having passed product rake 260 (see FIG. 6) is being transported toward first end 250 (see FIG. 6) of transporter belt 214. Product 150b, 150c, 150d, 150e, and 150f are currently being transported in direction 216 by transporter belt 214. It should be understood that only a portion of transporter belt 214 is being shown and that additional product 150 may be present in repository 236.

Referring to FIG. 11B, at a second time later than the first time, product 150b has been further transported in direction 216 and has been engaged by cleat 226c of belt 214. In addition, product 150c, 150d, 150e, and 150f are being transported in direction 216 and product, 150e is being engaged by cleat 226d of belt 214. It should be noted that the separation between product 150b and product 150c, 150d, 150e, and 150f is caused at least in part by the upward incline of transporter 204 along with the fact that product 150b has been engaged by cleat 226c. Further, the upward incline of transporter 204 has caused product 150f to rest against belt 214.

Referring to FIG. 11C, at a third time interval later than the second time interval, product 150e is passing under product rake 260 and product 150c and 150d have been pushed back in direction 217, opposite to direction 216 due to product 150c contacting a rake member 268 of product rake 260 (see FIG. 6) between the second and third time intervals. As such, as shown in FIGS. 11A, 11B, and 11C, product rake 260 (see FIG. 6) and the upward angle of belt 214 ensure that a single layer of product 150 is transported to first end 250 (see FIG. 6) of belt 214.

In one embodiment, the positioning of product rake 260 and/or the length of rake members 268 is adjustable to permit the configuration of product rake for various size products.

In alternative embodiments, additional means may be used to aid in ensuring that the product is in a single layer at the first end of the feed transporter. For instance, the product rake may be replaced with a fixed aperture. Further, the feed transporter may be vibrated by a vibration means to settle the product.

Referring to FIG. 7, the transition of product 150 (see FIGS. 11A–C) from belt 214 of transporter 204 to belt 254 of transporter 252 is controlled by a transport control system, such as transport control system 10. Referring to FIG. 7, transport control system 300 is shown. Transport control system 300 includes a controller 302, a first sensor 304, and a second sensor 306. First sensor 302 is positioned to detect the presence of product 150 in an output region 308 of transporter 204. Second sensor 306 is positioned to detect the presence of product 150 in an input region 310 of transporter 252.

As shown in FIG. 7, first sensor 304 includes an emitter 312 and a detector 314. Emitter 312 is configured to emit a signal, such as an infrared signal. The signal may be an analog signal, a digital signal, or other suitable signal type. Detector 314 monitors the reception of the signal emitted by emitter 312. Detector 314 in turn provides a sensing signal to controller 302 over one of a wired connection 316, a wireless connection, or a combination of a wired and wireless connection. The sensing signals can be one of one or more analog voltage signals, one or more analog current signals, and/or one or more digital signals. As shown in FIG. 7, emitter 312 and detector 314 are coupled to frame 202.

If product 150 is not positioned along a line 316 between emitter 312 and detector 314, detector 314 receives the signal emitted by emitter 312 and provides a corresponding sensing signal to controller 302. However, if product 150 is positioned along line 316 between emitter 312 and detector 314, detector 314 no longer receives the signal emitted by emitter 312 and provides a corresponding sensing signal to controller 302. In alternative embodiments, other types of sensors may be used, such as machine vision systems.

Second sensor 306 is generally similar to first sensor 304. Second sensor 306 includes an emitter 320 and a detector 322. Similarly to first sensor 304, emitter 320 emits a signal that is detected by detector 322. Detector 322 provides a sensing signal to controller 302 indicating the presence or absence of product 150. As shown in FIG. 7, emitter 320 and detector 322 are coupled to frame 202.

If product 150 is not positioned along a line 324 between emitter 320 and detector 322, detector 322 receives the signal emitted by emitter 320 and provides a corresponding sensing signal to controller 302. However, if product 150 is positioned along line 324 between emitter 320 and detector 322, detector 322 no longer receives the signal emitted by emitter 320 and provides a corresponding sensing signal to controller 302. In alternative embodiments, other types of sensors may be used, such as machine vision systems.

In a preferred embodiment, transport control system 300 receives or determines the baseline speed of transporter 252 and controls drive system 206 to set the speed of transporter 204, the feed transport speed. In a preferred example, controller 302 executes control routine 62 provided in FIG. 2 to determine the feed transport speed. Therefore, transport control system 300 ensures that product is positioned in the output region of transporter 204 to be transitioned to transporter 252 and that the product to be transitioned to transporter 252 is placed on transporter 252 in a single layer.

Further, controller 302 is connected to drive system 272 and controls the speed product rake 260 rotates in direction 276 (see FIG. 6). In one example, the rotation speed of product rake 260 is independent of the feed transport speed. In another example, the rotation speed of product rake 260 is dependent on the feed transport speed.

Further, by adjusting parameters of feed system 200 the density of product 150 placed on transporter 252 may be varied. Example parameters include a weight factor between the speed of transporter 204 and transporter 252, such as 70% or 110%, a ratio of the speed of transporter 204 and transporter 252, the angle of incline of transporter 204, and/or the rotation speed of product rake 260.

As such, with feed transport system 200 a plurality of randomly oriented products 150 may be dumped or otherwise placed in a holder 204 and still be presented to a conveyor or transporter in an ordered manner. The incline of transport 204 and/or the use of a product rake 260 ensure that a single layer of product is transported to the output region of transporter 204. Transport control system 300 ensures that product 150, if available, is ready to be transitioned to transporter 252 and that product 150 is transitioned to transporter 252 in a single layer.

Referring back to FIG. 5, it is preferred that transporter 132 moves along path 134 at the greatest speed possible to increase the number of finished products that can be assembled in a given timeframe. Example finished products include frozen dinners including trays 160 and appropriate food product, such as product 102. Further, it is preferred that the speed of transporter 132 remain a fixed speed. As such, the speeds of the various systems providing food products and trays 160 to transporter 132 need to accommodate the fixed speed of transporter 132 and insure that the respective food product and/or tray 160 is positioned properly.

Figure 13:
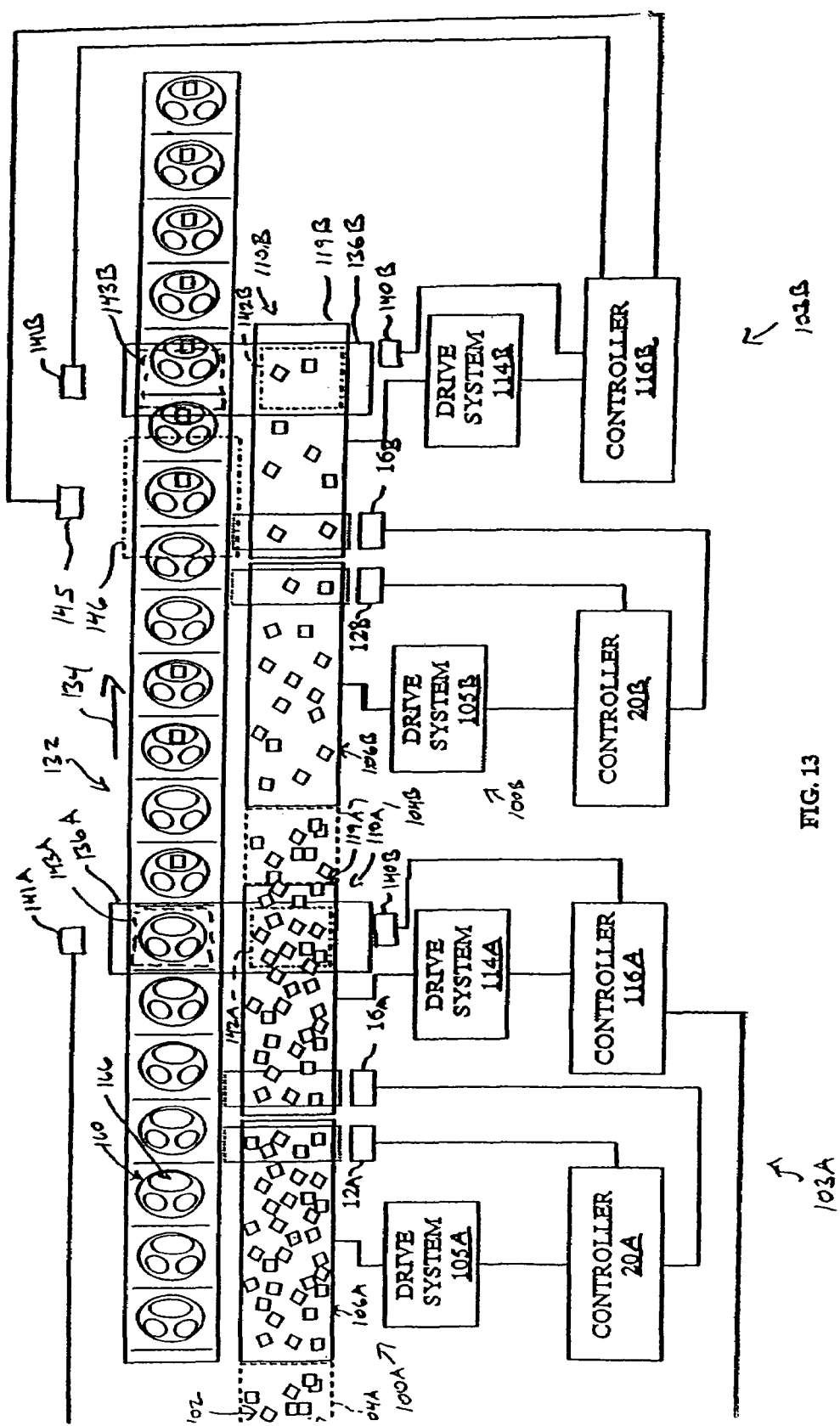
FIG. 13 is an arrangement of multiple feed systems in conjunction with multiple transporters and products movers arranged to provide a product to a main product line.

Referring to FIG. 13, transporter 132 as shown transporting a plurality of trays 160 generally in direction 134. Also shown is a first instance 100A of feed system 100 or 200 which provides product 102 to a first transporter 110A. As explained above, in reference to FIG. 5, a product mover 136A places or otherwise handles product 102 from transporter 110A to a respective compartment 166 of a tray 160 being transported by transporter 132. Feed system 100A, transporter 110A, and product mover 136A are collectively shown as 103A. Feed system 100A is configured to position a high density of product 102 on first transporter 110A while still maintaining product 102 in a single layer. Further the speed of first transporter 110A is chosen such that the amount of product 102 being transported by first transporter 110A generally exceeds the amount of product 102 that can be moved or otherwise manipulated by product mover 136A to transporter 132. However, by ensuring this excess of product 102, product mover 136A is able to operate at or near its max capacity. Further, the speed of first transporter 110A is not reduced to ensure that all of the product 102 is moved to transporter 132, but rather some of product 102 passes beyond product mover 136A along path 108.

Excess product 102 not moved by product mover 136A continues along path 108 to a second end 119A of transporter 110A. A second feed system 100B or 200 is positioned approximate to second end 119A of first transporter 110A such that the excess product 102 is placed or deposited into a holder 104B of second feed system 100B. Second feed system 100B is configured to provide product 102 to a second transporter 110B such that product 102 may be picked up or otherwise handled by a second product mover 136B. Feed system 100B, transporter 110B, and product mover 136B are collectively shown as 103B. Second product mover 136B detects the presence of a tray 160 within region 143 through a sensor 141. Further, product mover 136B is configured to place product 102 only in a tray 160 which does not already contain product 102 within compartment 166. In one embodiment, a second sensor 145 monitors a region 146 generally between product movers 136B and 136B such that the baseline speed of second transporter 110B can be adjusted based upon the number of empty trays 160 exiting product mover 136A.

In one embodiment, the speed of second transporter 110B is varied to adjust for the number of empty trays 160 moving towards product mover 136B. In one example, the speed of second transporter 110B is further adjusted to insure that all of product 102 transported by transporter 110B is moved by product mover 136B. Therefore, in this example, no excess product 102 is transported beyond product mover 136B.

Further, the density of product 102 positioned on transporter 10B is lower than the density of product 102 positioned on transporter 110A. In another embodiment, the speed of second transporter 110B is varied such that all of the product transported by second transporter 110B is similar to the speed of transporter 110A such that product mover 136B moves at closer to its max capacity and there is a potential for excess product 102. It is within the scope of the present invention to cascade a third feed system (not shown) adjacent a second end 119B of transporter 110B along with a third transporter (not shown) and a third product mover (not shown)

Figure 14:
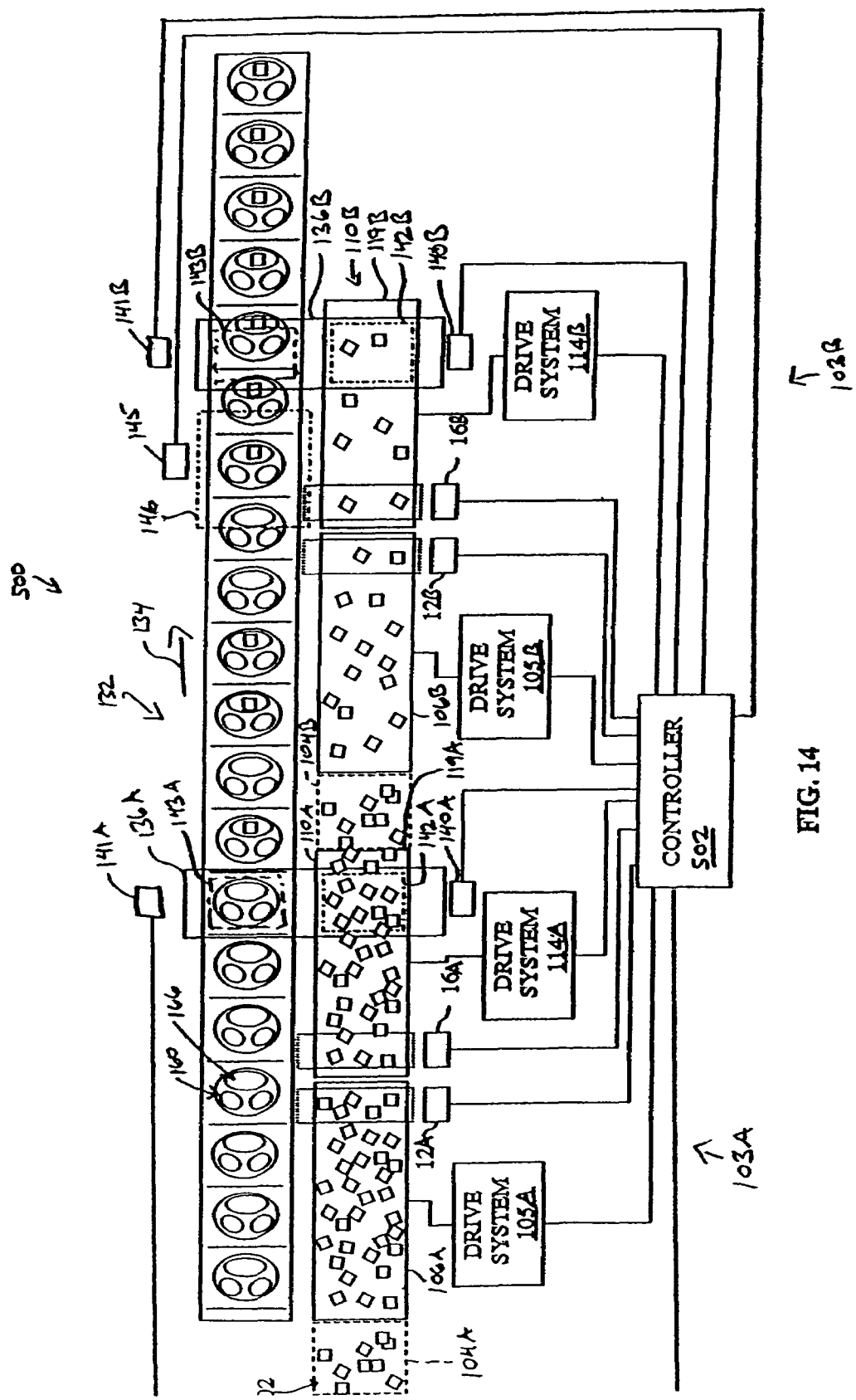
FIG. 14 is a variation of the arrangement of FIG. 13 wherein all of the feed systems, transporters and product movers are controlled by the same controller.
Figure 15:
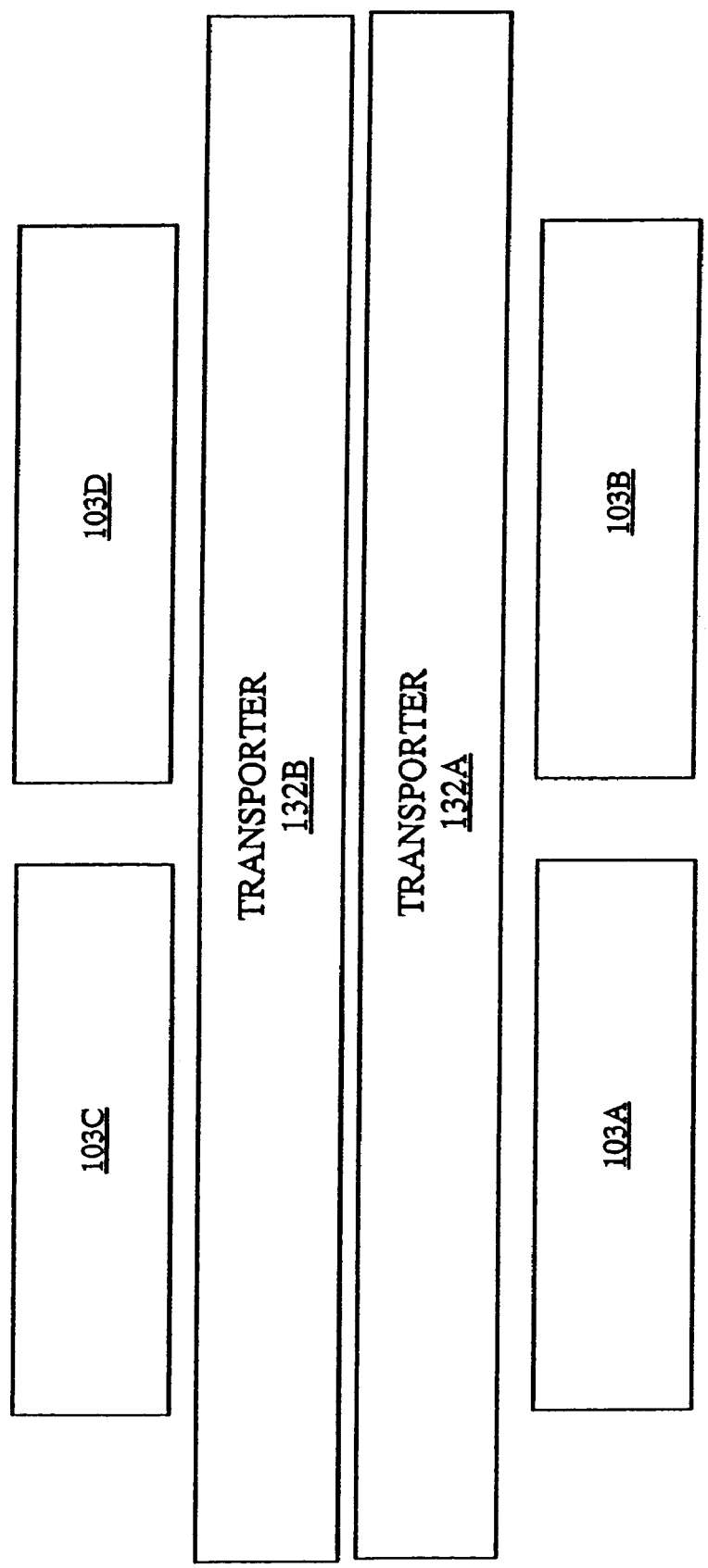
FIG. 15 is an arrangement of multiple feed systems in conjunction with multiple transporters and products movers arranged to provide a product to dual main product lines.

Referring to FIG. 14, a second embodiment 500 of a two part feed system is shown. Second embodiment 500 is generally the same as the arrangement shown in FIG. 13 except a single controller 502 controls feed systems 100A and 100B, transporters 110A and 110B, and product movers 136A and 136B. Referring to FIG. 15, an embodiment for a double sided line is shown having two transporter 132A, 132B each transporting trays 160 and each being feed product 102 by at least two feed systems, feed systems 100A and 100B and feed systems 100C and 100D, respectively.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

We claim:

1. A method of controlling the placement of at least one of a plurality of product from a first transporter moving at a transport speed and having an output region to a second transporter moving at a baseline speed and having an input region and an output region, the method comprising the steps of:
   setting the transport speed generally equal to the baseline speed in the absence of a product;
   monitoring the output region of the first transporter for the occurrence of a first event, wherein the first event corresponds to one of the detection of the presence of or absence of a first one of the product in the output region of the first transporter;
   monitoring the input region of the second transporter for the occurrence of a second event, wherein the second event corresponds to one of the detection of the presence of or absence of a second one of the product in the input region of the second transporter; and
   controlling the transport speed of the first transporter and the baseline speed of the second transporter upon a detection of at least one of the first event and the second event, wherein the transport speed is determined to be one of a speed greater than, less than, or equal to the baseline speed and the baseline speed is determined to be one of a speed greater than, less than, or equal to the transport speed upon the detection of at least one of the first event and the second event.

2. The method of claim 1, wherein the first event corresponds to the detection of the absence of the first one of the product from the output region of the first transporter.

3. The method of claim 2, wherein the transport speed is increased from the baseline speed in response to the detection of the first event.

4. The method of claim 1, wherein the first event corresponds to the detection of the presence of the first one of the product in the output region of the first transporter and the second event corresponds to the detection of the presence of a second one of the product in the input region of the second transporter.

5. The method of claim 4, wherein the transport speed is decreased from the baseline speed in response to the detection of the first and second event.

6. The method of claim 1, wherein the controlling step further comprises deviating the transport speed from the baseline speed upon the detection of the first event when the baseline speed remains the same.

7. The method of claim 6, wherein the controlling step further comprises maintaining the transport speed at the same speed upon the detection of the first event and upon a change to the baseline speed.

8. The method of claim 1, further comprising generating a signal when the first or second event corresponds to the detection of the absence of the first one of the product in one of the output region of the first transporter and the input region of the second transporter.

9. The method of claim 8, further comprising generating a signal when the first or second event corresponds to the detection of the presence of the first one of the product in one of the output region of the first transporter and the input region of the second transporter.

10. The method of claim 9, the controlling step including controlling the transport speed in response to the generated signal corresponding to the detection of the absence of the first one of the product.

11. The method of claim 10, the controlling step including controlling the transport speed in response to the generated signal corresponding to the presence of the first one of the product.

12. A transport control system for controlling the placement of at least one of a plurality of product from a first transporter to a second transporter, the first transporter having an output region and a first drive system to drive the first transporter at a transport speed and the second transporter having an input region, an output region, and a second drive system to drive the second transporter at a baseline speed, the transport control system comprising:
    a first sensor configured to detect the presence or absence of the product and positioned to detect the presence or absence of the product within the output region of the first transporter;
    a second sensor configured to detect the presence or absence of the product and positioned to detect the presence or absence of the product within the input region of the second transporter; and
    a controller connected to the first sensor and the second sensor, the controller configured to control the transport speed of the first transporter based at least on one of a first input signal from the first sensor and a second input signal from the second sensor, wherein the controller increases the transport speed above the baseline speed of the second transporter when the first input signal indicates that a first one of the product is not present in the output region of the first transporter, wherein the controller decreases the transport speed below the baseline speed of the second transporter when the first input signal indicates that the first one of the product is present in the output region of the first transporter and the second input signal indicates that a second one of the product is present in the input region of the second transporter, and wherein the controller increases the transport speed when the baseline speed is increased.

13. The transport control system of claim 12, wherein the first sensor includes an emitter and a detector configured to detect a signal emitted by the emitter.

14. The transport control system of claim 13, wherein when the first one of the product is within the output region of the first transporter, the signal emitted from the emitter is blocked by the first one of the product from reaching the detector.

15. The transport control system of claim 14, wherein the controller maintains the transport speed at the same speed upon the detection of the first one of the product within the output region of the first transporter and upon a change to the baseline speed.

16. The transport control system of claim 15, further comprising a third sensor configured to detect the presence or absence of the product and positioned to detect the presence or absence of the product within the output region of the second transporter.

17. The transport control system of claim 16, wherein the controller controls the baseline speed upon the detection of the first one of the product within the output region of the second transporter.

* * * * *